(12) United States Patent
Nakahara et al.

(10) Patent No.: US 10,907,019 B2
(45) Date of Patent: Feb. 2, 2021

(54) SYNTHETIC POLYMER FILM PROVIDED WITH SURFACE HAVING STERILIZING ACTIVITY

(71) Applicant: SHARP KABUSHIKI KAISHA, Sakai (JP)

(72) Inventors: Takahiro Nakahara, Sakai (JP); Miho Yamada, Sakai (JP); Ken Atsumo, Sakai (JP); Kiyoshi Minoura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 244 days.

(21) Appl. No.: 15/739,450

(22) PCT Filed: Jun. 20, 2016

(86) PCT No.: PCT/JP2016/068273
§ 371 (c)(1),
(2) Date: Dec. 22, 2017

(87) PCT Pub. No.: WO2016/208540
PCT Pub. Date: Dec. 29, 2016

(65) Prior Publication Data
US 2018/0194910 A1    Jul. 12, 2018

(30) Foreign Application Priority Data

Jun. 23, 2015 (JP) ................... 2015-125888
Sep. 15, 2015 (JP) ................... 2015-182004
Mar. 29, 2016 (JP) ................... 2016-065826

(51) Int. Cl.
*C08J 5/18* (2006.01)
*B32B 27/30* (2006.01)
(Continued)

(52) U.S. Cl.
CPC ................. *C08J 5/18* (2013.01); *A01N 25/10* (2013.01); *B08B 17/06* (2013.01); *B08B 17/065* (2013.01);
(Continued)

(58) Field of Classification Search
CPC ...... A01N 25/10; B08B 17/06; B08B 17/065; B32B 27/30; B32B 3/30; C08G 18/283;
(Continued)

(56) References Cited

U.S. PATENT DOCUMENTS 9,781,924 B2    10/2017    Yamada et al.
9,781,925 B2    10/2017    Yamada et al.
(Continued)

FOREIGN PATENT DOCUMENTS

CN    201329050 Y    10/2009
JP    H08-24843 A    1/1996
(Continued)

OTHER PUBLICATIONS

Pogodin, et. al., Biophysical Model of Bacterial Cell Interactions with Nanopatterned Cicada Wing Surfaces, Biophysical Journal, vol. 104, pp. 835-840 (Feb. 2013).
(Continued)

*Primary Examiner* — Travis M Figg
(74) *Attorney, Agent, or Firm* — ScienBiziP, P.C.

(57) ABSTRACT

A synthetic polymer film (34A), (34B) having a surface which has a plurality of raised portions (34Ap), (34Bp), wherein a two-dimensional size of the plurality of raised portions (34Ap), (34Bp) is in a range of more than 20 nm and less than 500 nm when viewed in a normal direction of the synthetic polymer film (34A), (34B), the surface having a microbicidal effect, and a concentration of a total of a nitrogen element which is a constituent of a primary amine and a nitrogen element which is a constituent of a secondary
(Continued)

amine is not less than 0.29 at %, and a number of moles of an ethylene oxide unit included in one gram is more than 0.0020 and not more than 0.0080.

6 Claims, 9 Drawing Sheets

(51) Int. Cl.

| | |
|---|---|
| B32B 3/30 | (2006.01) |
| C08G 18/67 | (2006.01) |
| C08G 18/79 | (2006.01) |
| A01N 25/10 | (2006.01) |
| B08B 17/06 | (2006.01) |
| C08G 18/81 | (2006.01) |
| C08G 18/28 | (2006.01) |
| C08G 18/38 | (2006.01) |

(52) U.S. Cl.
CPC ............... *B32B 3/30* (2013.01); *B32B 27/30* (2013.01); *C08G 18/283* (2013.01); *C08G 18/3851* (2013.01); *C08G 18/672* (2013.01); *C08G 18/6795* (2013.01); *C08G 18/792* (2013.01); *C08G 18/8116* (2013.01); *C08G 2105/02* (2013.01); *C08J 2375/04* (2013.01); *C08J 2375/08* (2013.01); *C08J 2375/16* (2013.01)

(58) Field of Classification Search
CPC ............ C08G 18/3851; C08G 18/672; C08G 18/6795; C08G 18/792; C08G 18/8116; C08G 2105/02; C08J 5/18; C08J 2375/04; C08J 2375/08; C08J 2375/16
See application file for complete search history.

(56) References Cited

U.S. PATENT DOCUMENTS

| | | | |
|---|---|---|---|
| 9,781,926 B2 | 10/2017 | Yamada et al. | |
| 2003/0205475 A1 | 11/2003 | Sawitowski | |
| 2007/0159698 A1 | 7/2007 | Taguchi et al. | |
| 2010/0203161 A1 | 8/2010 | Gehri et al. | |
| 2011/0235181 A1 | 9/2011 | Hayashibe et al. | |
| 2011/0281068 A1* | 11/2011 | David | G02B 1/118 428/141 |
| 2012/0162572 A1* | 6/2012 | Okuno | G02B 5/3083 349/61 |
| 2012/0200932 A1* | 8/2012 | Minari | B29C 33/56 359/601 |
| 2012/0318772 A1 | 12/2012 | Minoura et al. | |
| 2013/0057958 A1 | 3/2013 | Minoura et al. | |
| 2013/0296456 A1* | 11/2013 | Kobayashi | B82Y 40/00 522/93 |
| 2014/0077418 A1 | 3/2014 | Otani et al. | |
| 2015/0140154 A1 | 5/2015 | Isurugi et al. | |
| 2015/0140268 A1* | 5/2015 | Ikawa | B29C 33/3842 428/141 |
| 2015/0168610 A1 | 6/2015 | Fukui et al. | |
| 2015/0239022 A1* | 8/2015 | Kobayashi | C08J 5/18 428/172 |
| 2015/0273755 A1 | 10/2015 | Yee et al. | |
| 2016/0113274 A1 | 4/2016 | Yamada et al. | |
| 2016/0121005 A1 | 5/2016 | Nakahara et al. | |
| 2016/0212989 A1 | 7/2016 | Juodkazis et al. | |
| 2017/0258081 A1 | 9/2017 | Yamada et al. | |

FOREIGN PATENT DOCUMENTS

| | | | |
|---|---|---|---|
| JP | 2005-055114 A | 3/2005 | |
| JP | 2008-197217 A | 8/2008 | |
| JP | 4265729 B2 | 5/2009 | |
| JP | 2009-166502 A | 7/2009 | |
| JP | 2010-000719 A | 1/2010 | |
| JP | 2010-079200 A | 4/2010 | |
| JP | 2012-078438 A | 4/2012 | |
| JP | 2012-514239 A | 6/2012 | |
| JP | 2013-033287 A | 2/2013 | |
| JP | 2013-078573 A | 5/2013 | |
| JP | 2014-005341 A | 1/2014 | |
| JP | 2014-029391 A | 2/2014 | |
| JP | 2014-066975 A | 4/2014 | |
| JP | 2014-202955 A | 10/2014 | |
| JP | 2015-024549 A | 2/2015 | |
| JP | 5788128 B1 | 9/2015 | |
| JP | 2016-026546 A | 2/2016 | |
| JP | 2016-093939 A | 5/2016 | |
| JP | 2016-104545 A | 6/2016 | |
| WO | 2011/125486 A1 | 10/2011 | |
| WO | 2011/148721 A1 | 12/2011 | |
| WO | 2013/183576 A1 | 12/2013 | |
| WO | 2013/191092 A1 | 12/2013 | |
| WO | 2014/013922 A1 | 1/2014 | |
| WO | WO-2014013922 A1 * | 1/2014 | ........... C08G 18/792 |
| WO | 2014/021376 A1 | 2/2014 | |
| WO | 2014/171365 A1 | 10/2014 | |
| WO | 2015/166725 A1 | 11/2015 | |
| WO | 2016/080245 A1 | 5/2016 | |

OTHER PUBLICATIONS

Co-pending letter for related co-pending U.S. Appl. No. 14/771,833, U.S. Appl. No. 15/386,131, U.S. Appl. No. 15/437,044, U.S. Appl. No. 15/592,922, U.S. Appl. No. 15/784,771, U.S. Appl. No. 14/897,252, and U.S. Appl. No. 15/126,078.
Office Action dated Dec. 29, 2016 issued in the related U.S. Appl. No. 14/771,833.
Office Action dated Oct. 27, 2016 issued in the related U.S. Appl. No. 14/771,833.
E.P. Ivanova et al., "Bactericidal activity of black silicon", Nature Communications, Published Nov. 26, 2013, 19pgs, Macmillan Publishers Limited.
Epstein, A.K. et al. "Liquid-infused structured surfaces with exceptional anti-biofouling performances," p. 13182-13187, PNAS, Aug. 14, 2012, vol. 109, No. 33.
Yao, C. et al. "Decreased bacteria density on nanostructured polyurethane," Society for Biomaterials, pp. 1823-1828, Jun. 29, 2013.
Ivanova, E. et al., "Natural Bactericidal Surfaces: Mechanical Repture of Pseudomonas aeruginosa Cells by Cicada Wings," Small Journal, pp. 1-6, 2012.
Trafton, A., (2006) "MIT's Anti-Microbial "Paint" Kills Flu, Bacteria" http://chemistry.mit.edu/mitsanti-microbial-paint-kills-flu-bacteria, p. 2-4.
Good Housekeeping (2011) "Do-It-All Cleaning Guide" http://www.goodhousekeeping.com/home/cleaning/tips/a18875/how-to-clean/ , p. 1-12.
Office Action dated Mar. 9, 2017 issued in U.S. Appl. No. 15/386,131.

* cited by examiner

*FIG.1*
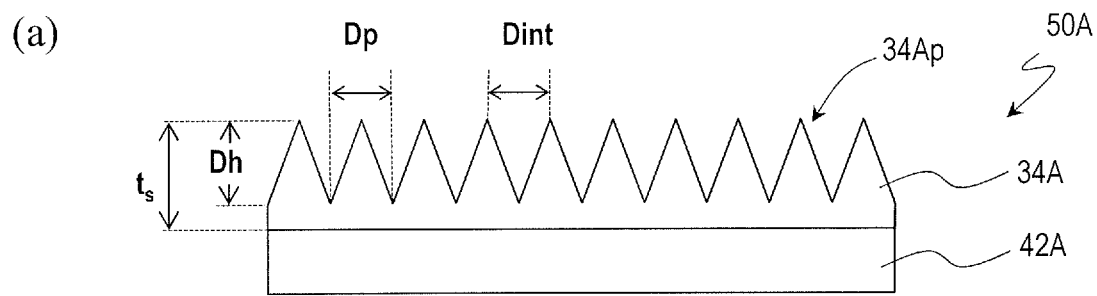
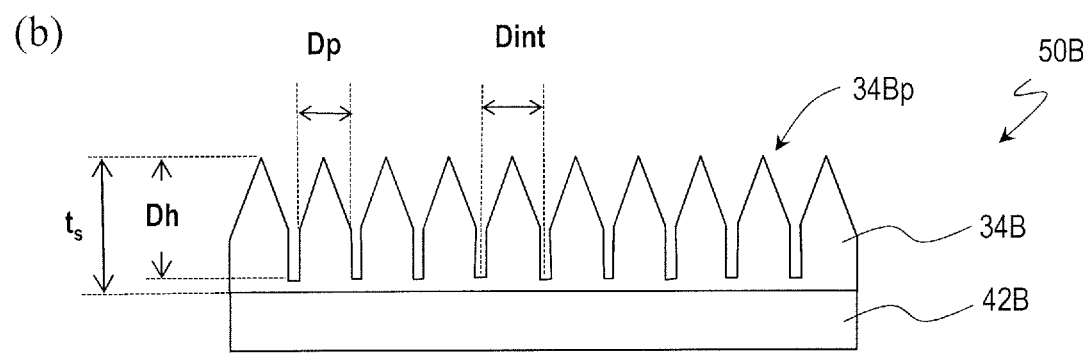

FIG.4
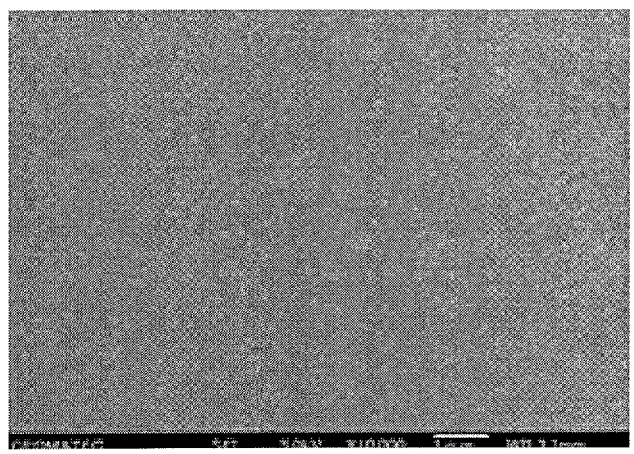
(a)
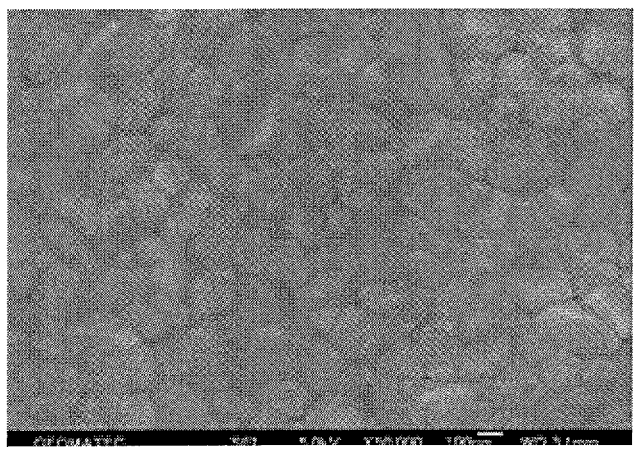
(b)
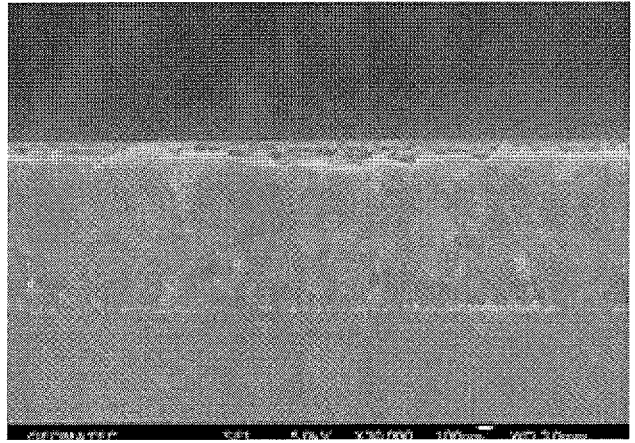
(c)

FIG.5
(a)
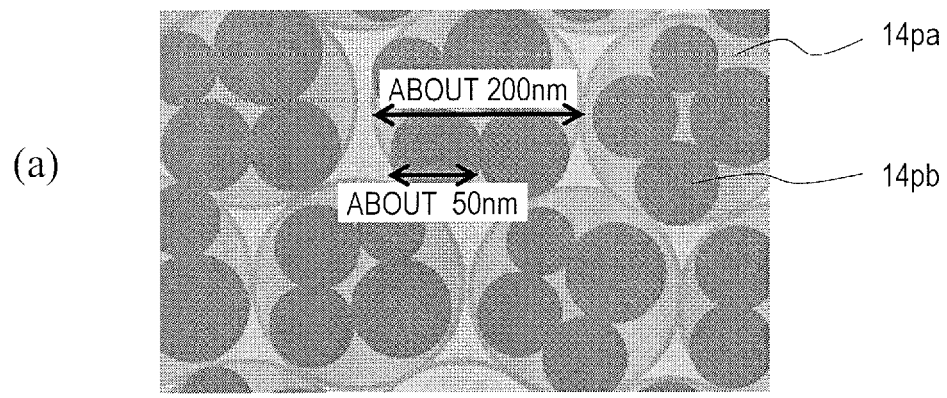
(b)
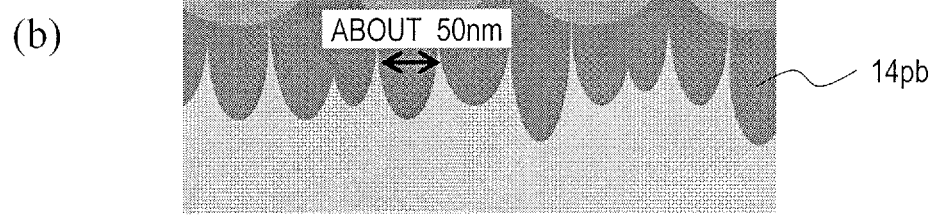
(c)
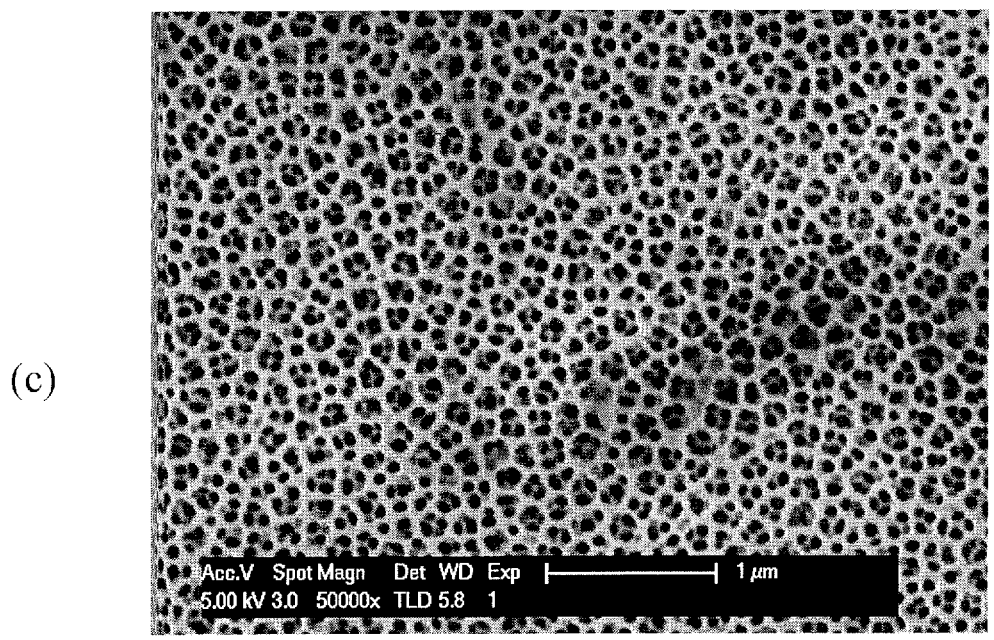

FIG. 7
(a)
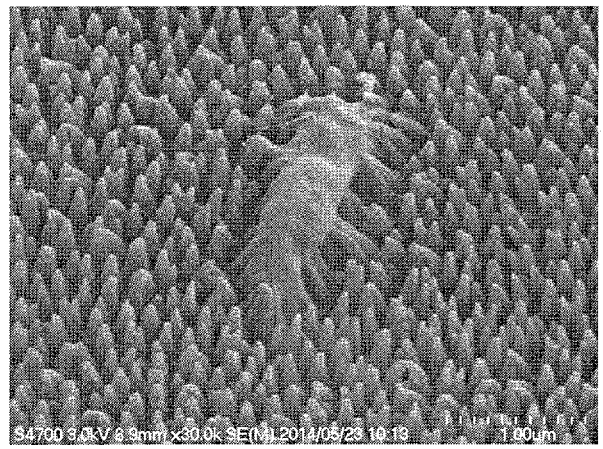
1.00μm
(b)
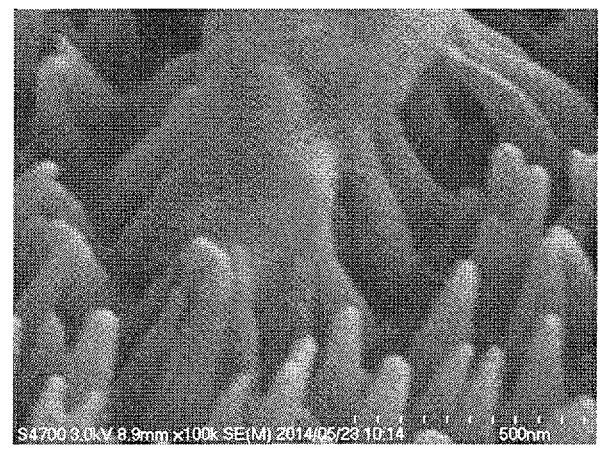
500nm

SYNTHETIC POLYMER FILM PROVIDED WITH SURFACE HAVING STERILIZING ACTIVITY

TECHNICAL FIELD

The present invention relates to a synthetic polymer film whose surface has a microbicidal activity, a sterilization method with the use of the surface of the synthetic polymer film, a mold for production of the synthetic polymer film, and a mold manufacturing method. In this specification, the "mold" includes molds that are for use in various processing methods (stamping and casting), and is sometimes referred to as a stamper. The "mold" can also be used for printing (including nanoimprinting).

BACKGROUND ART

Recently, it was reported that surficial nanostructures of black silicon, wings of cicadas and dragonflies have a bactericidal activity (Non-patent Document 1). Reportedly, the physical structure of the nanopillars that black silicon and wings of cicadas and dragonflies have produces a bactericidal activity.

According to Non-patent Document 1, black silicon has the strongest bactericidal activity on Gram-negative bacteria, while wings of dragonflies have a weaker bactericidal activity, and wings of cicadas have a still weaker bactericidal activity. Black silicon has 500 nm tall nanopillars. Wings of cicadas and dragonflies have 240 nm tall nanopillars. The static contact angle (hereinafter, sometimes simply referred to as "contact angle") of the black silicon surface with respect to water is 80°, while the contact angles of the surface of wings of dragonflies and cicadas with respect to water are 153° and 159°, respectively. It is estimated that black silicon is mainly made of silicon, and wings of dragonflies and cicadas are made of chitin. According to Non-patent Document 1, the composition of the surface of black silicon is generally a silicon oxide, and the composition of the surface of wings of dragonflies and cicadas is generally a lipid.

CITATION LIST

Patent Literature

Patent Document 1: Japanese Patent No. 4265729
Patent Document 2: Japanese Laid-Open Patent Publication No. 2009-166502
Patent Document 3: WO 2011/125486
Patent Document 4: WO 2013/183576

Non-Patent Literature

Non-patent Document 1: Ivanova, E. P. et al., "Bactericidal activity of black silicon", Nat. Commun. 4:2838 doi: 10.1038/ncomms3838 (2013).

SUMMARY OF INVENTION

Technical Problem

The mechanism of killing bacteria by nanopillars is not clear from the results described in Non-patent Document 1. It is also not clear whether the reason why black silicon has a stronger bactericidal activity than wings of dragonflies and cicadas resides in the difference in height or shape of nanopillars, in the difference in surface free energy (which can be evaluated by the contact angle), in the materials that constitute nanopillars, or in the chemical properties of the surface.

The bactericidal activity of black silicon is difficult to utilize because black silicon is poor in mass productivity, and is hard but brittle so that the shapability is poor.

The present invention was conceived for the purpose of solving the above problems. The major objects of the present invention include providing a synthetic polymer film whose surface has a microbicidal activity, a sterilization method with the use of the surface of the synthetic polymer film, a mold for production of the synthetic polymer film, and a mold manufacturing method. The objects of the present invention further include providing a synthetic polymer film which has excellent water resistance and whose surface has a microbicidal activity. Here, the "synthetic polymer film which has excellent water resistance" refers to a synthetic polymer film which has at least one of the following effects: (1) when a film including the synthetic polymer film and a base film is brought into contact with water for a predetermined duration, the entire film is prevented from curling; (2) when a film including the synthetic polymer film and a base film is brought into contact with water for a predetermined duration, the synthetic polymer film is prevented from separating from the base film; and (3) when a synthetic polymer film is brought into contact with water for a predetermined duration, decrease of the microbicidal effect (including microbicidal ability and antimicrobial ability) of the synthetic polymer film is suppressed.

Solution to Problem

A synthetic polymer film according to an embodiment of the present invention is a synthetic polymer film having a surface which has a plurality of raised portions, wherein a two-dimensional size of the plurality of raised portions is in a range of more than 20 nm and less than 500 nm when viewed in a normal direction of the synthetic polymer film, the surface having a microbicidal effect, and a concentration of a total of a nitrogen element which is a constituent of a primary amine and a nitrogen element which is a constituent of a secondary amine is not less than 0.29 at %, and a number of moles of an ethylene oxide unit included in one gram is more than 0.0020 and not more than 0.0080.

In one embodiment, the concentration of a total of a nitrogen element which is a constituent of a primary amine and a nitrogen element which is a constituent of a secondary amine is not less than 0.33 at %.

In one embodiment, the synthetic polymer film includes a urethane acrylate structure.

A synthetic polymer film according to another embodiment of the present invention is a synthetic polymer film having a surface which has a plurality of raised portions, wherein a two-dimensional size of the plurality of raised portions is in a range of more than 20 nm and less than 500 nm when viewed in a normal direction of the synthetic polymer film, the surface having a microbicidal effect, the synthetic polymer film includes a urethane acrylate structure, the urethane acrylate structure includes a repeating structure of an ethylene oxide unit, and the urethane acrylate structure does not include a repeating structure of which n is not less than 6 where n is a repeating number of the repeating structure (n is an integer not less than 2).

In one embodiment, the urethane acrylate structure includes a polymer of a urethane acrylate monomer which has three or more functional groups.

In one embodiment, the urethane acrylate monomer includes a heterocycle which includes a nitrogen element.

In one embodiment, the heterocycle is a cyanuric ring.

In one embodiment, a number of moles of an ethylene oxide unit included in one gram is not less than 0.0095 and not more than 0.0108.

In one embodiment, a concentration of a total of a nitrogen element which is a constituent of a primary amine and a nitrogen element which is a constituent of a secondary amine is not less than 1.46 at % and not more than 1.63 at %.

Advantageous Effects of Invention

According to an embodiment of the present invention, a synthetic polymer film whose surface has a microbicidal activity, a sterilization method with the use of the surface of the synthetic polymer film, a mold for production of the synthetic polymer film, and a mold manufacturing method are provided. According to an embodiment of the present invention, a synthetic polymer film which has excellent water resistance and whose surface has a microbicidal activity is further provided. Here, the "synthetic polymer film which has excellent water resistance" refers to a synthetic polymer film which has at least one of the following effects: (1) when a film including the synthetic polymer film and a base film is brought into contact with water for a predetermined duration, the entire film is prevented from curling; (2) when a film including the synthetic polymer film and a base film is brought into contact with water for a predetermined duration, the synthetic polymer film is prevented from separating from the base film; and (3) when a synthetic polymer film is brought into contact with water for a predetermined duration, decrease of the microbicidal effect (including microbicidal ability and antimicrobial ability) of the synthetic polymer film is suppressed.

BRIEF DESCRIPTION OF DRAWINGS

FIG. 1 (a) and (b) are schematic cross-sectional views of synthetic polymer films 34A and 34B, respectively, according to embodiments of the present invention.

FIG. 4 (a) shows a SEM image of a surface of an aluminum base. (b) shows a SEM image of a surface of an aluminum film. (c) shows a SEM image of a cross section of the aluminum film.

FIG. 5 (a) is a schematic plan view of a porous alumina layer of a mold. (b) is a schematic cross-sectional view of the porous alumina layer. (c) is a SEM image of a prototype mold.

FIG. 7 (a) and (b) show SEM images obtained by SEM (Scanning Electron Microscope) observation of a *P. aeruginosa* bacterium which died at a surface which had a moth-eye structure.

DESCRIPTION OF EMBODIMENTS

Figure 2:
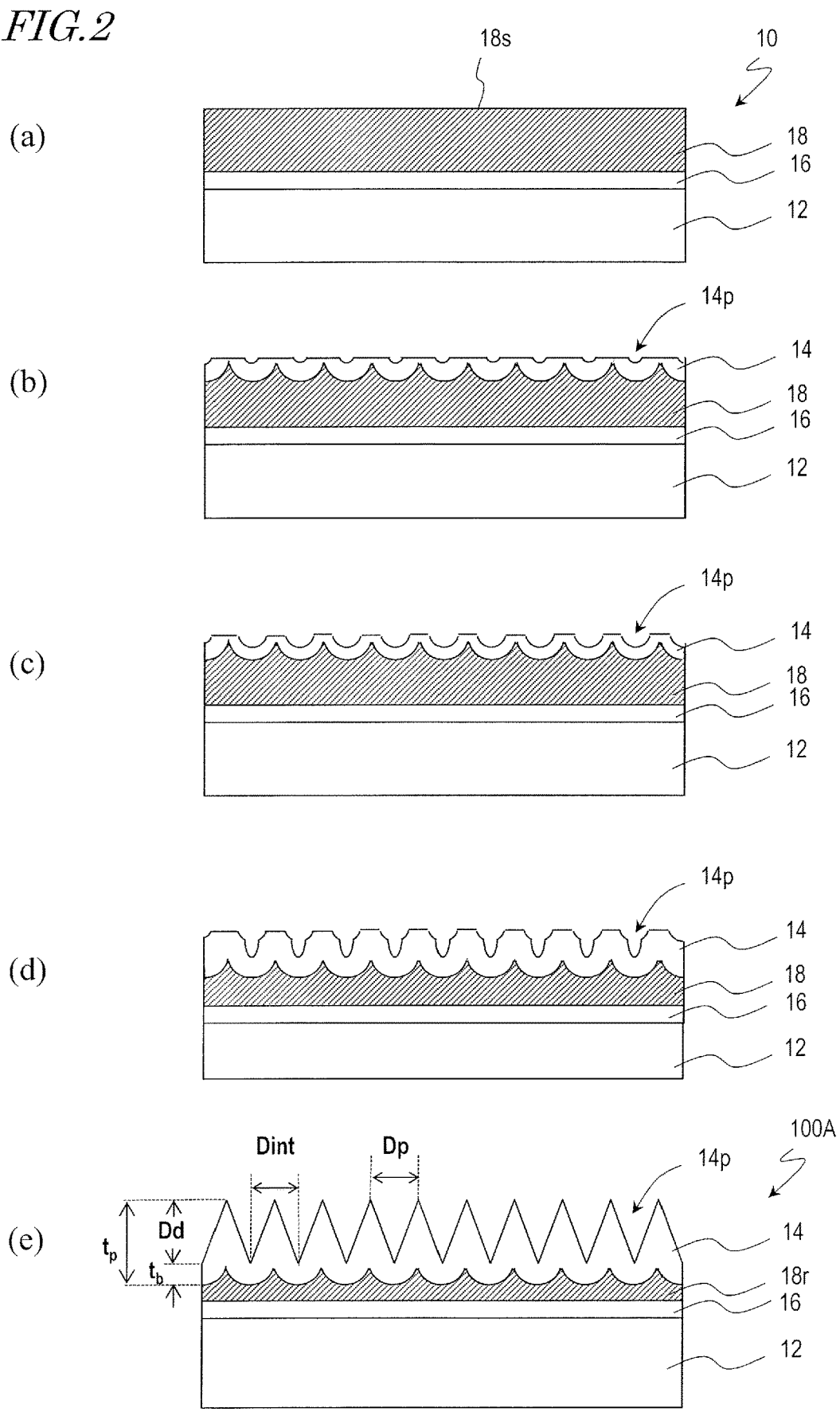
FIG. 2 (a) to (e) are diagrams for illustrating a method for manufacturing a moth-eye mold 100A and a configuration of the moth-eye mold 100A.

Hereinafter, a synthetic polymer film whose surface has a microbicidal effect, a sterilization method with the use of the surface of the synthetic polymer film, a mold for production of the synthetic polymer film, and a mold manufacturing method according to embodiments of the present invention are described with reference to the drawings.

In this specification, the following terms are used.

"Sterilization" (or "microbicidal") means reducing the number of proliferative microorganisms contained in an object, such as solid or liquid, or a limited space, by an effective number.

"Microorganism" includes viruses, bacteria, and fungi.

"Antimicrobial" generally includes suppressing and preventing multiplication of microorganisms and includes suppressing dinginess and slime which are attributed to microorganisms.

The present applicant conceived a method for producing an antireflection film (an antireflection surface) which has a moth-eye structure with the use of an anodized porous alumina layer. Using the anodized porous alumina layer enables manufacture of a mold which has an inverted moth-eye structure with high mass-productivity (e.g., Patent Documents 1 to 4). The entire disclosures of Patent Documents 1 to 4 are incorporated by reference in this specification.

The present inventors developed the above-described technology and arrived at the concept of a synthetic polymer film whose surface has a microbicidal effect.

The configuration of a synthetic polymer film according to an embodiment of the present invention is described with reference to FIGS. 1(a) and 1(b).

FIGS. 1(a) and 1(b) respectively show schematic cross-sectional views of synthetic polymer films 34A and 34B according to embodiments of the present invention. The synthetic polymer films 34A and 34B described herein as examples are formed on base films 42A and 42B, respectively, although the present invention is not limited to these examples. The synthetic polymer films 34A and 34B can be directly formed on a surface of an arbitrary object.

A film 50A shown in FIG. 1(a) includes a base film 42A and a synthetic polymer film 34A provided on the base film 42A. The synthetic polymer film 34A has a plurality of raised portions 34Ap over its surface. The plurality of raised portions 34Ap constitute a moth-eye structure. When viewed in a normal direction of the synthetic polymer film 34A, the two-dimensional size of the raised portions 34Ap, $D_p$, is in the range of more than 20 nm and less than 500 nm. Here, the "two-dimensional size" of the raised portions 34Ap refers to the diameter of a circle equivalent to the area of the raised portions 34Ap when viewed in a normal direction of the surface. When the raised portions 34Ap have a conical shape, for example, the two-dimensional size of the raised portions 34Ap is equivalent to the diameter of the base of the cone. The typical adjoining distance of the raised portions 34Ap, $D_{int}$, is more than 20 nm and not more than 1000 nm. When the raised portions 34Ap are densely arranged so that there is no gap between adjoining raised portions 34Ap (e.g., the bases of the cones partially overlap each other) as shown in FIG. 1(a), the two-dimensional size of the raised portions 34Ap, $D_p$, is equal to the adjoining distance $D_{int}$. The typical height of the raised portions 34Ap, $D_h$, is not less than 50 nm and less than 500 nm. As will be described later, a microbicidal activity is exhibited even when the height $D_h$ of the raised portions 34Ap is not more than 150 nm. The thickness of the synthetic polymer film 34A, $t_s$, is not particularly limited but only needs to be greater than the height $D_h$ of the raised portions 34Ap.

The synthetic polymer film 34A shown in FIG. 1(a) has the same moth-eye structure as the antireflection films disclosed in Patent Documents 1 to 4. From the viewpoint of producing an antireflection function, it is preferred that the surface has no flat portion, and the raised portions 34Ap are densely arranged over the surface. Further, the raised portions 34Ap preferably has a such shape that the cross-sectional area (a cross section parallel to a plane which is orthogonal to an incoming light ray, e.g., a cross section parallel to the surface of the base film 42A) increases from the air side to the base film 42A side, e.g., a conical shape. From the viewpoint of suppressing interference of light, it is preferred that the raised portions 34Ap are arranged without regularity, preferably randomly. However, these features are unnecessary when only the microbicidal activity of the synthetic polymer film 34A is pursued. For example, the raised portions 34Ap do not need to be densely arranged. The raised portions 34Ap may be regularly arranged. Note that, however, the shape and arrangement of the raised portions 34Ap are preferably selected such that the raised portions 34Ap effectively act on microorganisms.

A film 50B shown in FIG. 1(b) includes a base film 42B and a synthetic polymer film 34B provided on the base film 42B. The synthetic polymer film 34B has a plurality of raised portions 34Bp over its surface. The plurality of raised portions 34Bp constitute a moth-eye structure. In the film 50B, the configuration of the raised portions 34Bp of the synthetic polymer film 34B is different from that of the raised portions 34Ap of the synthetic polymer film 34A of the film 50A. Descriptions of features which are common with those of the film 50A are sometimes omitted.

When viewed in a normal direction of the synthetic polymer film 34B, the two-dimensional size of the raised portions 34Bp, $D_p$, is in the range of more than 20 nm and less than 500 nm. The typical adjoining distance of the raised portions 34Bp, $D_{int}$, is more than 20 nm and not more than 1000 nm, and $D_p<D_{int}$ holds. That is, in the synthetic polymer film 34B, there is a flat portion between adjoining raised portions 34Bp. The raised portions 34Bp have the shape of a cylinder with a conical portion on the air side. The typical height of the raised portions 34Bp, $D_h$, is not less than 50 nm and less than 500 nm. The raised portions 34Bp may be arranged regularly or may be arranged irregularly. When the raised portions 34Bp are arranged regularly, $D_{int}$ also represents the period of the arrangement. This also applies to the synthetic polymer film 34A, as a matter of course.

In this specification, the "moth-eye structure" includes not only surficial nanostructures that have an excellent antireflection function and that are formed by raised portions which have such a shape that the cross-sectional area (a cross section parallel to the film surface) increases as do the raised portions 34Ap of the synthetic polymer film 34A shown in FIG. 1(a) but also surficial nanostructures that are formed by raised portions which have a part where the cross-sectional area (a cross section parallel to the film surface) is constant as do the raised portions 34Bp of the synthetic polymer film 34B shown in FIG. 1(b). Note that, from the viewpoint of breaking the cell walls and/or cell membranes of microorganisms, providing a conical portion is preferred. Note that, however, the tip end of the conical shape does not necessarily need to be a surficial nanostructure but may have a rounded portion (about 60 nm) which is generally equal to the nanopillars which form surficial nanostructures of the wings of cicadas.

A mold for forming the moth-eye structure such as illustrated in FIGS. 1(a) and 1(b) over the surface (hereinafter, referred to as "moth-eye mold") has an inverted moth-eye structure obtained by inverting the moth-eye structure. Using an anodized porous alumina layer which has the inverted moth-eye structure as a mold without any modification enables inexpensive production of the moth-eye structure. Particularly when a moth-eye mold in the shape of a hollow cylinder is used, the moth-eye structure can be efficiently manufactured according to a roll-to-roll method. Such a moth-eye mold can be manufactured according to methods disclosed in Patent Documents 2 to 4.

A manufacturing method of a moth-eye mold 100A that is for production of the synthetic polymer film 34A is described with reference to FIGS. 2(a) to 2(e).

Firstly, a mold base 10 is provided which includes an aluminum base 12, an inorganic material layer 16 provided on a surface of the aluminum base 12, and an aluminum film 18 deposited on the inorganic material layer 16 as shown in FIG. 2(a).

The aluminum base 12 used may be an aluminum base whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum film 18 and the aluminum base 12 in a portion in which the abrasive particles are present. Not only in the portion in which the abrasive particles are remaining but also in a portion which has a roughened surface, conduction readily occurs between the aluminum film 18 and the aluminum base 12. When conduction occurs locally between the aluminum film 18 and the aluminum base 12, there is a probability that a local cell reaction will occur between an impurity in the aluminum base 12 and the aluminum film 18.

The material of the inorganic material layer 16 may be, for example, tantalum oxide ($Ta_2O_5$) or silicon dioxide ($SiO_2$). The inorganic material layer 16 can be formed by, for example, sputtering. When a tantalum oxide layer is used as the inorganic material layer 16, the thickness of the tantalum oxide layer is, for example, 200 nm.

The thickness of the inorganic material layer 16 is preferably not less than 100 nm and less than 500 nm. If the thickness of the inorganic material layer 16 is less than 100 nm, there is a probability that a defect (typically, a void; i.e., a gap between crystal grains) occurs in the aluminum film 18. If the thickness of the inorganic material layer 16 is not less than 500 nm, insulation is likely to occur between the aluminum base 12 and the aluminum film 18 due to the surface condition of the aluminum base 12. To realize anodization of the aluminum film 18 by supplying an electric current from the aluminum base 12 side to the aluminum film 18, the electric current needs to flow between the aluminum base 12 and the aluminum film 18. When employing a configuration where an electric current is supplied from the inside surface of the aluminum base 12 in the shape of a hollow cylinder, it is not necessary to provide an electrode to the aluminum film 18. Therefore, the aluminum film 18 can be anodized across the entire surface, while such a problem does not occur that supply of the electric current becomes more difficult as the anodization advances. Thus, the aluminum film 18 can be anodized uniformly across the entire surface.

To form a thick inorganic material layer 16, it is in general necessary to increase the film formation duration. When the film formation duration is increased, the surface temperature of the aluminum base 12 unnecessarily increases, and as a result, the film quality of the aluminum film 18 deteriorates, and a defect (typically, a void) occurs in some cases. When the thickness of the inorganic material layer 16 is less than 500 nm, occurrence of such a problem can be suppressed.

The aluminum film 18 is, for example, a film which is made of aluminum whose purity is not less than 99.99 mass % (hereinafter, sometimes referred to as "high-purity aluminum film") as disclosed in Patent Document 3. The aluminum film is formed by, for example, vacuum evaporation or sputtering. The thickness of the aluminum film 18 is preferably in the range of not less than about 500 nm and not more than about 1500 nm. For example, the thickness of the aluminum film 18 is about 1 μm.

The aluminum film 18 may be an aluminum alloy film disclosed in Patent Document 4 in substitution for the high-purity aluminum film. The aluminum alloy film disclosed in Patent Document 4 contains aluminum, a metal element other than aluminum, and nitrogen. In this specification, the "aluminum film" includes not only the high-purity aluminum film but also the aluminum alloy film disclosed in Patent Document 4.

Using the above-described aluminum alloy film enables to obtain a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Then, a surface 18s of the aluminum film 18 is anodized to form a porous alumina layer 14 which has a plurality of recessed portions (micropores) 14p as shown in FIG. 2(b). The porous alumina layer 14 includes a porous layer which has the recessed portions 14p and a barrier layer (the base of the recessed portions (micropores) 14p). As known in the art, the interval between adjacent recessed portions 14p (the distance between the centers) is approximately twice the thickness of the barrier layer and is approximately proportional to the voltage that is applied during the anodization. This relationship also applies to the final porous alumina layer 14 shown in FIG. 2(e).

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum film 18 is anodized with an applied voltage of 80 V for 55 seconds using an oxalic acid aqueous solution (concentration: 0.3 mass %, solution temperature: 10° C.), whereby the porous alumina layer 14 is formed.

Then, the porous alumina layer 14 is brought into contact with an alumina etchant such that a predetermined amount is etched away, whereby the opening of the recessed portions 14p is enlarged as shown in FIG. 2(c). By modifying the type and concentration of the etching solution and the etching duration, the etching amount (i.e., the size and depth of the recessed portions 14p) can be controlled. The etching solution used may be, for example, an aqueous solution of 10 mass % phosphoric acid, organic acid such as formic acid, acetic acid or citric acid, or sulfuric acid, or a chromic/phosphoric acid solution. For example, the etching is performed for 20 minutes using a phosphoric acid aqueous solution (10 mass %, 30° C.)

Then, the aluminum film 18 is again partially anodized such that the recessed portions 14p are grown in the depth direction and the thickness of the porous alumina layer 14 is increased as shown in FIG. 2(d). Here, the growth of the recessed portions 14p starts at the bottoms of the previously-formed recessed portions 14p, and accordingly, the lateral surfaces of the recessed portions 14p have stepped shapes.

Thereafter, when necessary, the porous alumina layer 14 may be brought into contact with an alumina etchant to be further etched such that the pore diameter of the recessed portions 14p is further increased. The etching solution used in this step may preferably be the above-described etching solution. Practically, the same etching bath may be used.

In this way, by alternately repeating the anodization step and the etching step as described above through multiple cycles (e.g., 5 cycles: including 5 anodization cycles and 4 etching cycles), the moth-eye mold 100A that includes the porous alumina layer 14 which has the inverted moth-eye structure is obtained as shown in FIG. 2(e). Since the process is ended with the anodization step, the recessed portions 14p have pointed bottom portion. That is, the resultant mold enables formation of raised portions with pointed tip ends.

The porous alumina layer 14 (thickness: $t_p$) shown in FIG. 2(e) includes a porous layer (whose thickness is equivalent to the depth $D_d$ of the recessed portions 14p) and a barrier layer (thickness: $t_b$). Since the porous alumina layer 14 has a structure obtained by inverting the moth-eye structure of the synthetic polymer film 34A, corresponding parameters which define the dimensions may sometimes be designated by the same symbols.

The recessed portions 14p of the porous alumina layer 14 may have, for example, a conical shape and may have a stepped lateral surface. It is preferred that the two-dimensional size of the recessed portions 14p (the diameter of a circle equivalent to the area of the recessed portions 14p when viewed in a normal direction of the surface), $D_p$, is more than 20 nm and less than 500 nm, and the depth of the recessed portions 14p, $D_d$, is not less than 50 nm and less than 1000 nm (1 μm). It is also preferred that the bottom portion of the recessed portions 14p is acute (with the deepest part of the bottom portion being pointed). When the recessed portions 14p are in a densely packed arrangement, assuming that the shape of the recessed portions 14p when viewed in a normal direction of the porous alumina layer 14 is a circle, adjacent circles overlap each other, and a saddle portion is formed between adjacent ones of the recessed portions 14p. Note that, when the generally-conical recessed portions 14p adjoin one another so as to form saddle portions, the two-dimensional size of the recessed portions 14p, $D_p$, is equal to the adjoining distance $D_{int}$. The thickness of the porous alumina layer 14, $t_p$, is not more than about 1 μm.

Under the porous alumina layer 14 shown in FIG. 2(e), there is an aluminum remnant layer 18r. The aluminum remnant layer 18r is part of the aluminum film 18 which has not been anodized. When necessary, the aluminum film 18 may be substantially thoroughly anodized such that the aluminum remnant layer 18r is not present. For example, when the inorganic material layer 16 has a small thickness, it is possible to readily supply an electric current from the aluminum base 12 side.

The manufacturing method of the moth-eye mold illustrated herein enables manufacture of a mold which is for production of antireflection films disclosed in Patent Documents 2 to 4. Since an antireflection film used in a high-definition display panel is required to have high uniformity, selection of the material of the aluminum base, specular working of the aluminum base, and control of the purity and components of the aluminum film are preferably carried out as described above. However, the above-described mold manufacturing method can be simplified because the microbicidal activity can be achieved without high uniformity. For example, the surface of the aluminum base may be directly anodized. Even if, in this case, pits are formed due to impurities contained in the aluminum base, only local structural irregularities occur in the moth-eye structure of the finally-obtained synthetic polymer film 34A, and it is estimated that there is little adverse influence on the microbicidal activity.

According to the above-described mold manufacturing method, a mold in which the regularity of the arrangement of the recessed portions is low, and which is suitable to production of an antireflection film, can be manufactured. In the case of utilizing the microbicidal ability of the moth-eye structure, it is estimated that the regularity of the arrangement of the raised portions does not exert an influence. A mold for formation of a moth-eye structure which has regularly-arranged raised portions can be manufactured, for example, as described in the following section.

For example, after formation of a porous alumina layer having a thickness of about 10 μm, the formed porous alumina layer is removed by etching, and then, anodization may be performed under the conditions for formation of the above-described porous alumina layer. A 10 μm thick porous alumina layer is realized by extending the anodization duration. When such a relatively thick porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a chromic/phosphoric acid solution is preferred. Although continuing the etching for a long period of time sometimes causes galvanic corrosion, the chromic/phosphoric acid solution has the effect of suppressing galvanic corrosion.

A moth-eye mold for production of the synthetic polymer film 34B shown in FIG. 1(b) can be, basically, manufactured by combination of the above-described anodization step and etching step. A manufacturing method of a moth-eye mold 100B that is for production of the synthetic polymer film 34B is described with reference to FIGS. 3(a) to 3(c).

Firstly, in the same way as illustrated with reference to FIGS. 2(a) and 2(b), the mold base 10 is provided, and the surface 18s of the aluminum film 18 is anodized, whereby a porous alumina layer 14 which has a plurality of recessed portions (micropores) 14p is formed.

Figure 3:
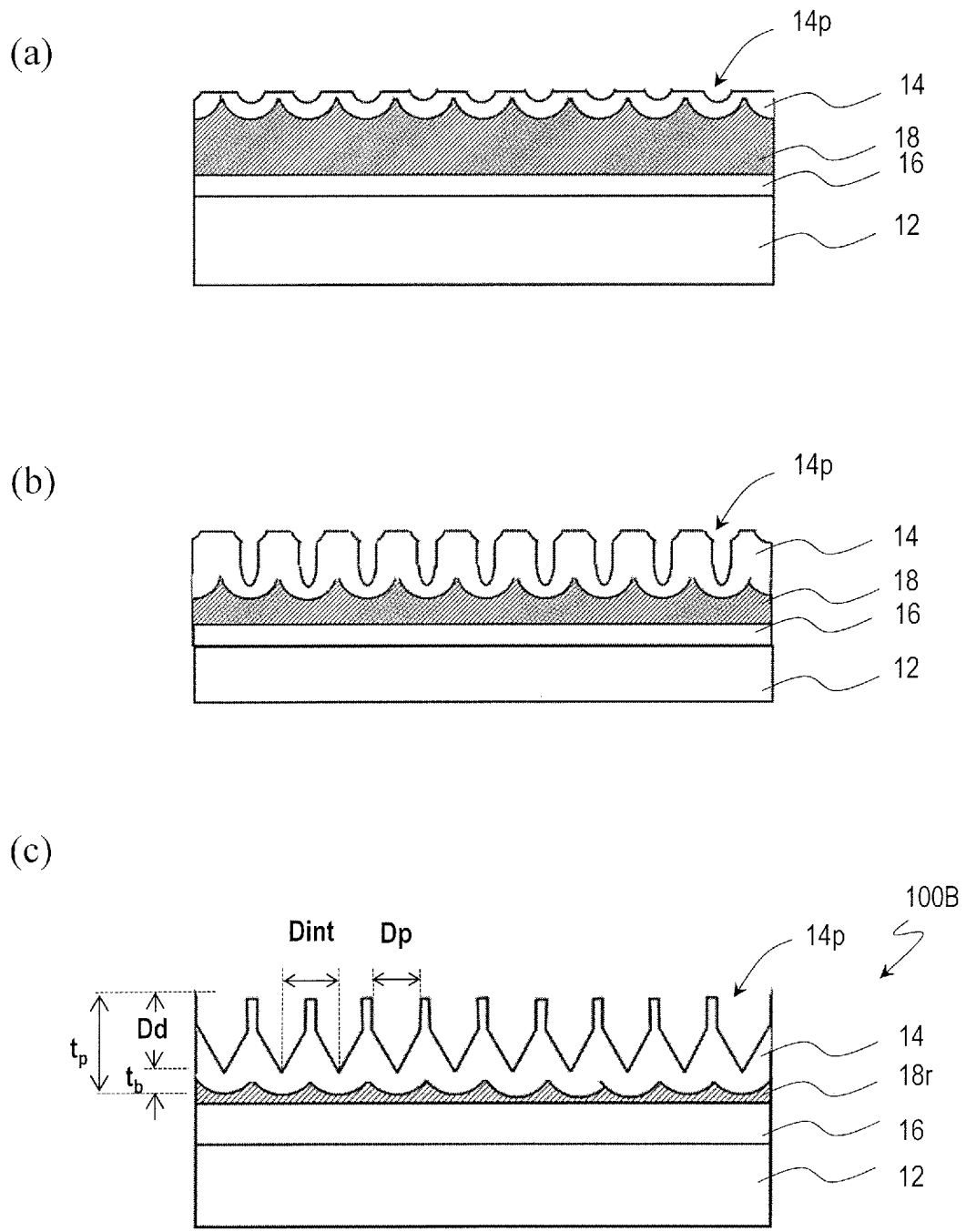
FIG. 3 (a) to (c) are diagrams for illustrating a method for manufacturing a moth-eye mold 100B and a configuration of the moth-eye mold 100B.

Then, the porous alumina layer 14 is brought into contact with an alumina etchant such that a predetermined amount is etched away, whereby the opening of the recessed portions 14p is enlarged as shown in FIG. 3(a). In this step, the etched amount is smaller than in the etching step illustrated with reference to FIG. 2(c). That is, the size of the opening of the recessed portions 14p is decreased. For example, the etching is performed for 10 minutes using a phosphoric acid aqueous solution (10 mass %, 30° C.)

Then, the aluminum film 18 is again partially anodized such that the recessed portions 14p are grown in the depth direction and the thickness of the porous alumina layer 14 is increased as shown in FIG. 3(b). In this step, the recessed portions 14p are grown deeper than in the anodization step illustrated with reference to FIG. 2(d). For example, the anodization is carried out with an applied voltage of 80 V for 165 seconds (in FIG. 2(d), 55 seconds) using an oxalic acid aqueous solution (concentration: 0.3 mass %, solution temperature: 10° C.)

Thereafter, the etching step and the anodization step are alternately repeated through multiple cycles in the same way as illustrated with reference to FIG. 2(e). For example, 3 cycles of the etching step and 3 cycles of the anodization step are alternately repeated, whereby the moth-eye mold 100B including the porous alumina layer 14 which has the inverted moth-eye structure is obtained as shown in FIG. 3(c). In this step, the two-dimensional size of the recessed portions 14p, $D_p$, is smaller than the adjoining distance $D_{int}$ ($D_p < D_{int}$).

The size of the microorganisms varies depending on their types. For example, the size of P. aeruginosa is about 1 μm. However, the size of the bacteria ranges from several hundreds of nanometers to about five micrometers. The size of fungi is not less than several micrometers. It is estimated that, for example, raised portions whose two-dimensional size is about 200 nm have a microbicidal activity on a microorganism whose size is not less than about 0.5 μm, but there is a probability that the raised portions are too large to exhibit a sufficient microbicidal activity on a bacterium whose size is several hundreds of nanometers. The size of viruses ranges from several tens of nanometers to several hundreds of nanometers, and many of them have a size of not more than 100 nm. Note that viruses do not have a cell membrane but have a protein shell called capsid which encloses virus nucleic acids. The viruses can be classified into those which have a membrane-like envelope outside the shell and those which do not have such an envelope. In the viruses which have an envelope, the envelope is mainly made of a lipid. Therefore, it is expected that the raised portions likewise act on the envelope. Examples of the viruses which have an envelope include influenza virus and Ebola virus. In the viruses which do not have an envelope, it is expected that the raised portions likewise act on this protein shell called capsid. When the raised portions include nitrogen element, the raised portions can have an increased affinity for a protein which is made of amino acids.

In view of the above, the configuration and production method of a synthetic polymer film having raised portions which can exhibit a microbicidal activity against a microorganism of not more than several hundreds of nanometers are described below.

In the following description, raised portions of the above-described synthetic polymer film which have a two-dimensional size in the range of more than 20 nm and less than 500 nm are referred to as "first raised portions". Raised portions which are superimposedly formed over the first raised portions are referred to as "second raised portions". The two-dimensional size of the second raised portions is smaller than the two-dimensional size of the first raised portions and does not exceed 100 nm. Note that when the two-dimensional size of the first raised portions is less than 100 nm, particularly less than 50 nm, it is not necessary to provide the second raised portions. Recessed portions of the mold corresponding to the first raised portions are referred to as "first recessed portions", and recessed portions of the mold corresponding to the second raised portions are referred to as "second recessed portions".

When the method of forming the first recessed portions which have predetermined size and shape by alternately performing the anodization step and the etching step as described above is applied without any modification, the second recessed portions cannot be formed successfully.

FIG. 4(a) shows a SEM image of a surface of an aluminum base (designated by reference numeral 12 in FIG. 2). FIG. 4(b) shows a SEM image of a surface of an aluminum film (designated by reference numeral 18 in FIG. 2). FIG. 4(c) shows a SEM image of a cross section of the aluminum film (designated by reference numeral 18 in FIG. 2). As seen from these SEM images, there are grains (crystal grains) at the surface of the aluminum base and the surface of the aluminum film. The grains of the aluminum film form unevenness at the surface of the aluminum film. This unevenness at the surface affects formation of the recessed portions in the anodization and therefore interrupts formation of second recessed portions whose $D_p$ or $D_{int}$ is smaller than 100 nm.

In view of the above, a mold manufacturing method according to an embodiment of the present invention includes: (a) providing an aluminum base or an aluminum film deposited on a support; (b) the anodization step of applying a voltage at the first level while a surface of the aluminum base or aluminum film is kept in contact with an electrolytic solution, thereby forming a porous alumina layer which has the first recessed portions; (c) after step (b), the etching step of bringing the porous alumina layer into contact with an etching solution, thereby enlarging the first recessed portions; and (d) after step (c), applying a voltage at the second level that is lower than the first level while the porous alumina layer is kept in contact with an electrolytic solution, thereby forming the second recessed portions in the first recessed portions. For example, the first level is higher than 40 V, and the second level is equal to or lower than 20 V.

Specifically, an anodization step is carried out with the voltage at the first level, whereby the first recessed portions are formed which have such a size that is not influenced by the grains of the aluminum base or aluminum film. Thereafter, the thickness of the barrier layer is decreased by etching, and then, another anodization step is carried out with the voltage at the second level that is lower than the first level, whereby the second recessed portions are formed in the first recessed portions. When the second recessed portions are formed through such a procedure, the influence of the grains is avoided.

A mold which has first recessed portions 14pa and second recessed portions 14pb formed in the first recessed portions 14pa is described with reference to FIG. 5. FIG. 5(a) is a schematic plan view of a porous alumina layer of a mold. FIG. 5(b) is a schematic cross-sectional view of the porous alumina layer. FIG. 5(c) shows a SEM image of a prototype mold.

As shown in FIGS. 5(a) and 5(b), the surface of the mold of the present embodiment has the plurality of first recessed portions 14pa whose two-dimensional size is in the range of more than 20 nm and less than 500 nm and the plurality of second recessed portions 14pb which are superimposedly formed over the plurality of first recessed portions 14pa. The two-dimensional size of the plurality of second recessed portions 14pb is smaller than the two-dimensional size of the plurality of first recessed portions 14pa and does not exceed 100 nm. The height of the second recessed portions 14pb is, for example, more than 20 nm and not more than 100 nm. The second recessed portions 14pb preferably have a generally conical portion as do the first recessed portions 14pa.

The porous alumina layer shown in FIG. 5(c) was formed as described below.

The aluminum film used was an aluminum film which contains Ti at 1 mass %. The anodization solution used was an oxalic acid aqueous solution (concentration: 0.3 mass %, solution temperature: 10° C.). The etching solution used was a phosphoric acid aqueous solution (concentration: 10 mass %, solution temperature: 30° C.). After the anodization was carried out with a voltage of 80 V for 52 seconds, the etching was carried out for 25 minutes. Then, the anodization was carried out with a voltage of 80 V for 52 seconds, and the etching was carried out for 25 minutes. Thereafter, the anodization was carried out with a voltage of 20 V for 52 seconds, and the etching was carried out for 5 minutes. Further, the anodization was carried out with a voltage of 20 V for 52 seconds.

As seen from FIG. 5(c), the second recessed portions whose $D_p$ was about 50 nm were formed in the first recessed portions whose $D_p$ was about 200 nm. When in the above-described manufacturing method the voltage at the first level was changed from 80 V to 45 V for formation of the porous alumina layer, the second recessed portions whose $D_p$ was about 50 nm were formed in the first recessed portions whose $D_p$ was about 100 nm.

When a synthetic polymer film is produced using such a mold, the produced synthetic polymer film has raised portions whose configuration is the inverse of that of the first recessed portions 14pa and the second recessed portions 14pb shown in FIGS. 5(a) and 5(b). That is, the produced synthetic polymer film further includes a plurality of second raised portions superimposedly formed over a plurality of first raised portions.

The thus-produced synthetic polymer film which has the first raised portions and the second raised portions superimposedly formed over the first raised portions has a microbicidal activity on various microorganisms, ranging from relatively small microorganisms of about 100 nm to relatively large microorganisms of not less than 5 μm.

As a matter of course, only raised portions whose two-dimensional size is in the range of more than 20 nm and less than 100 nm may be formed according to the size of a target microorganism. The mold for formation of such raised portions can be manufactured, for example, as described below.

The anodization is carried out using a neutral salt aqueous solution (ammonium borate, ammonium citrate, etc.), such as an ammonium tartrate aqueous solution, or an organic acid which has a low ionic dissociation degree (maleic acid, malonic acid, phthalic acid, citric acid, tartaric acid, etc.) to form a barrier type anodized film. After the barrier type anodized film is removed by etching, the anodization is carried out with a predetermined voltage (the voltage at the second level described above), whereby recessed portions whose two-dimensional size is in the range of more than 20 nm and less than 100 nm can be formed.

For example, an aluminum film which contains Ti at 1 mass % is anodized at 100 V for 2 minutes using a tartaric acid aqueous solution (concentration: 0.1 mol/l, solution temperature: 23° C.), whereby a barrier type anodized film is formed. Thereafter, the etching is carried out for 25 minutes using a phosphoric acid aqueous solution (concentration: 10 mass %, solution temperature: 30° C.), whereby the barrier type anodized film is removed. Thereafter, the anodization and the etching are alternatively repeated as described above, specifically through 5 anodization cycles and 4 etching cycles. The anodization was carried out at 20 V for 52 seconds using an oxalic acid aqueous solution (concentration: 0.3 mass %, solution temperature: 10° C.) as the anodization solution. The etching was carried out for 5 minutes using the above-described etching solution. As a result, recessed portions whose two-dimensional size is about 50 nm can be uniformly formed.

Moth-eye molds which are capable of forming various moth-eye structures can be manufactured as described above.

Figure 6:
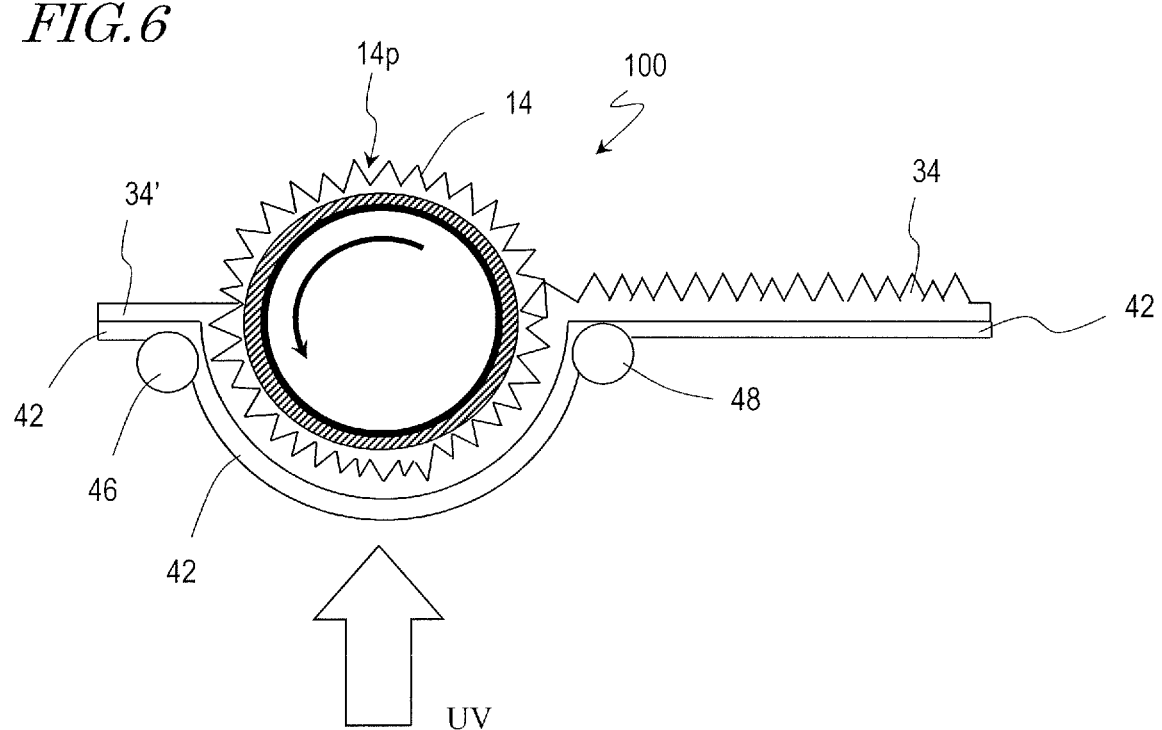
FIG. 6 A diagram for illustrating a method for producing a synthetic polymer film with the use of the moth-eye mold 100.

Next, a method for producing a synthetic polymer film with the use of a moth-eye mold 100 is described with reference to FIG. 6. FIG. 6 is a schematic cross-sectional view for illustrating a method for producing a synthetic polymer film according to a roll-to-roll method.

First, a moth-eye mold 100 in the shape of a hollow cylinder is provided. Note that the moth-eye mold 100 in the shape of a hollow cylinder is manufactured according to, for example, the manufacturing method described with reference to FIG. 2.

As shown in FIG. 6, a base film 42 over which a UV-curable resin 34' is applied on its surface is maintained pressed against the moth-eye mold 100, and the UV-curable resin 34' is irradiated with ultraviolet (UV) light such that the UV-curable resin 34' is cured. The UV-curable resin 34' used may be, for example, an acrylic resin. The base film 42 may be, for example, a PET (polyethylene terephthalate) film or TAC (triacetyl cellulose) film. The base film 42 is fed from an unshown feeder roller, and thereafter, the UV-curable resin 34' is applied over the surface of the base film 42 using, for example, a slit coater or the like. The base film 42 is supported by supporting rollers 46 and 48 as shown in FIG. 6. The supporting rollers 46 and 48 have rotation mechanisms for carrying the base film 42. The moth-eye mold 100 in the shape of a hollow cylinder is rotated at a rotation speed corresponding to the carrying speed of the base film 42 in a direction indicated by the arrow in FIG. 6.

Thereafter, the moth-eye mold 100 is separated from the base film 42, whereby a synthetic polymer film 34 to which the inverted moth-eye structure of the moth-eye mold 100 is transferred is formed on the surface of the base film 42. The base film 42 which has the synthetic polymer film 34 formed on the surface is wound up by an unshown winding roller.

The surface of the synthetic polymer film 34 has the moth-eye structure obtained by inverting the surficial nanostructures of the moth-eye mold 100. According to the surficial nanostructure of the moth-eye mold 100 used, the synthetic polymer films 34A and 34B shown in FIGS. 1(a) and 1(b), respectively, can be produced. The material that forms the synthetic polymer film 34 is not limited to the UV-curable resin but may be a photocurable resin which is curable by visible light or may be a thermosetting resin.

The microbicidal ability of a synthetic polymer film which has the moth-eye structure over its surface has not only a correlation with the physical structure of the synthetic polymer film but also a correlation with the chemical properties of the synthetic polymer film. For example, the present applicant found correlations with chemical properties, such as a correlation with the contact angle of the surface of the synthetic polymer film (Patent Publication 1: Japanese Patent No. 5788128) and a correlation with the concentration of the nitrogen element contained in the surface (International Publication 2: WO 2016/080245). As disclosed in International Publication 2, the concentration of the nitrogen element at the surface is preferably not less than 0.7 at %. The entire disclosures of Patent Publication 1 and International Publication 2 are incorporated by reference in this specification.

Figure 8:
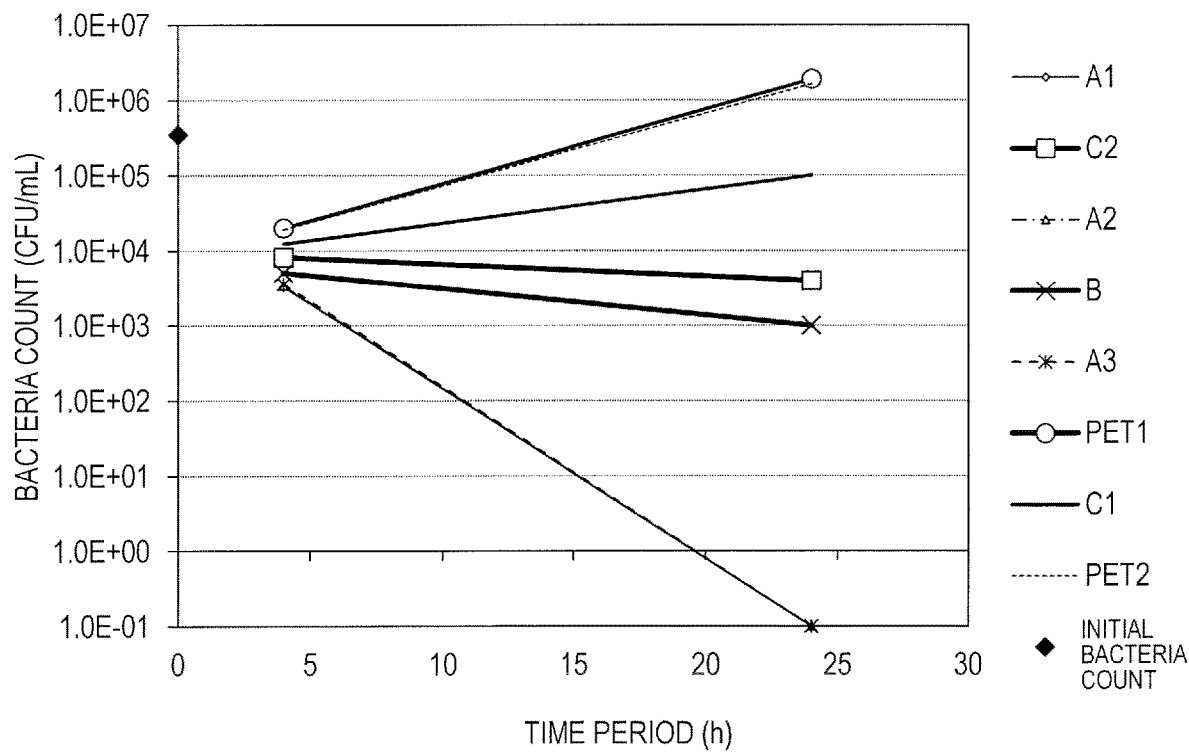
FIG. 8 A graph showing the evaluation results as to the microbicidal ability.

FIG. 7 shows SEM images disclosed in International Publication 2 (FIG. 8). FIGS. 7(a) and 7(b) show SEM images obtained by SEM (Scanning Electron Microscope) observation of a *P. aeruginosa* bacterium which died at the surface which had the moth-eye structure shown in FIG. 1(a).

As seen from these SEM images, the tip end portions of the raised portions enter the cell wall (exine) of a *P. aeruginosa* bacterium. In FIGS. 7(a) and 7(b), the raised portions do not appear to break through the cell wall but appears to be taken into the cell wall. This might be explained by the mechanism suggested in the "Supplemental Information" section of Non-patent Document 1. That is, it is estimated that the exine (lipid bilayer) of the Gram-negative bacteria came close to the raised portions and deformed so that the lipid bilayer locally underwent a transition like a first-order phase transition (spontaneous reorientation) and openings were formed in portions close to the raised portions, and the raised portions entered these openings. Alternatively, it is estimated that the raised portions were taken in due to the cell's mechanism of taking a polar substance (including a nutrient source) into the cell (endocytosis).

Note that antireflection films which are placed over the surface of liquid crystal television displays manufactured and sold until now by the present applicant are hydrophilic. This is for the purpose of facilitating wiping away of grease, such as fingerprint, adhered to the moth-eye structure. If the moth-eye structure is not hydrophilic, an aqueous washing solution cannot effectively enter the gap between raised portions of the moth-eye structure so that the grease cannot be wiped away.

According to research carried out by the present inventors, it was found that hydrophilic synthetic polymer films such as those used as conventional antireflection films have poor water resistance. For example, when a film 50A which has the structure shown in FIG. 1(a) is kept in contact with water for a long time period (e.g., about 24 hours whole day and night), there is a probability that the entire film 50A curls or the synthetic polymer film 34A separates from the base film (e.g., PET film) 42A. When the synthetic polymer film is kept in contact with water for a predetermined time period, there is a probability that the microbicidal effect of the synthetic polymer film decreases.

In view of such, in an embodiment of the present invention, improvement in water resistance of the film 50A was examined with varying compositions of the resin that forms the synthetic polymer film 34A. In the following section, an acrylic resin (which was UV-curable) was used as the material that forms the synthetic polymer film 34A.

[1] Prevention of Curl and/or Film Separation

First, we researched a film including a synthetic polymer film and a base film, concerning how to prevent the entire film from curling and/or how to prevent the synthetic polymer film from separating from the base film when the film is kept in contact with water for a certain period of time.

Herein, as for the acrylic resin, urethane acrylate was mixed with acrylic resins which had varying contents of ethylene oxide group or ethylene oxide unit (which refers to a structural unit obtained by ring-opening of ethylene oxide; hereinafter, also referred to as "EO unit"), whereby the proportion of the EO units included in the entire acrylic resin was adjusted. When there are many EO units, the synthetic polymer film 34A is highly flexible and highly hydrophilic. However, when there are too many EO units, the synthetic polymer film 34A is excessively hydrophilic. In view of such, decreasing the EO units as compared with conventional films for the antireflection film was considered for preventing occurrence of curl and/or film separation.

[Synthetic Polymer Film]

A sample film was provided which had the same configuration as that of the film 50A shown in FIG. 1(a). As the acrylic resin (acrylate monomer or acrylate oligomer) for manufacture of the synthetic polymer film 34A that had the moth-eye structure over the surface, 10 types of resins shown in Table 1 below, resins A1 to A5, B, C1 to C2, D and E, were used. Hereinafter, the sample films are also identified by A1 to A5, B, C1 to C2, D and E affixed to their names as the resins are. Table 1 shows the composition of the respective resins (in Table 1, % means mass %). The chemical structure formulae of acrylic resins I to V will be shown in [Chemical Formula 1] to [Chemical Formula 5], respectively. Table 1 shows the molecular weight (MW) of acrylic resins I to V and the number of EO units included in one molecule of acrylic resins I to V, and the number of moles of EO unit included in one gram of resins A1 to A5, B, C1 to C2, D and E. In Table 1, the resins are shown in ascending order of the number of moles of EO unit. Table 1 also shows the amount of nitrogen elements in at % for each of resins A1 to A5, B, C1 to C2, D and E, which was calculated based on the composition and the chemical formulae. In Table 1, the nitrogen element concentration of the total of nitrogen elements which are constituents of the primary amines and nitrogen elements which are constituents of the secondary amines and the nitrogen element concentration calculated with all nitrogen elements (i.e., including nitrogen elements which are constituents of the tertiary amines) are shown together.

Resins A1 to E were each dissolved into MEK (manufactured by Maruzen Petrochemical Co., Ltd.), resulting in a solution, 70 mass % of which was solid. The resultant solution was applied onto the base film 42A, and MEK was removed by heating, whereby a film having a thickness of about 25 μm to 50 μm was obtained (only sample film C2 was 3 μm in thickness). Note that the base film 42A used was a 50 μm thick PET film (A4300 manufactured by TOYOBO CO., LTD.). Thereafter, a synthetic polymer film 34A which had the moth-eye structure over the surface was produced using the moth-eye mold 100A through the same process as that described with reference to FIG. 6. The exposure amount was about 200 mJ/cm$^2$. In each sample film, $D_p$ was about 200 nm, $D_{int}$ was about 200 nm, and $D_h$ was about 150 nm.

TABLE 1

| | Acrylic Resin I UA-7100 | Acrylic Resin II A-9300-1CL | Acrylic Resin III ATM-35E | Acrylic Resin IV 4-HBA | Acrylic Resin V A-TMM-3LM-N | Photoinitiator IRGACURE 819 | Antimicrobial Ability/ Microbicidal Ability | Curl/ Film Separation | Number of Moles of EO Unit | Nitrogen at % (Primary and Secondary Amines) | Nitrogen at % (All Nitrogen Elements) |
|---|---|---|---|---|---|---|---|---|---|---|---|
| Number of EO Units/MW | 27/1908 | 3/537 | 35/1892 | 0/144 | 0/298 | | | | | | |

TABLE 1-continued

| | Acrylic Resin I UA-7100 | Acrylic Resin II A-9300-1CL | Acrylic Resin III ATM-35E | Acrylic Resin IV 4-HBA | Acrylic Resin V A-TMM-3LM-N | Photoinitiator IRGACURE 819 | Antimicrobial Ability/ Microbicidal Ability | Curl/ Film Separation | Number of Moles of EO Unit | Nitrogen at % (Primary and Secondary Amines) | Nitrogen at % (All Nitrogen Elements) |
|---|---|---|---|---|---|---|---|---|---|---|---|
| Resin C1 | 14.18% | — | — | 85.11% | — | 0.71% | X/X | ○/○ | 0.0020 | 0.146 | 0.293 |
| Resin A1 | 28.37% | — | — | — | 70.92% | 0.71% | ○/○ | △/○ | 0.0040 | 0.327 | 0.653 |
| Resin C2 | 28.37% | — | 70.92% | — | — | 0.71% | ○/X | ○/○ | 0.0040 | 0.293 | 0.586 |
| Resin A2 | 42.55% | — | — | — | 56.74% | 0.71% | ○/○ | ○/○ | 0.0060 | 0.480 | 0.960 |
| Resin B | 28.37% | 70.92% | — | — | — | 0.71% | ○/X | ○/○ | 0.0080 | 0.331 | 3.598 |
| Resin A3 | 56.74% | — | — | — | 42.55% | 0.71% | ○/○ | ○/○ | 0.0080 | 0.627 | 1.254 |
| Resin A4 | 70.92% | — | — | — | 28.37% | 0.71% | ○/○ | △/X | 0.0100 | 0.768 | 1.537 |
| Resin A5 | 85.11% | — | — | — | 14.18% | 0.71% | ○/○ | △/X | 0.0120 | 0.904 | 1.808 |
| Resin D | 99.29% | — | — | — | — | 0.71% | ○/○ | △/X | 0.0141 | 1.035 | 2.070 |
| Resin E | 28.37% | — | 70.92% | — | — | 0.71% | ○/○ | ○/△ | 0.0171 | 0.293 | 0.585 |

[Chemical Formula 1]

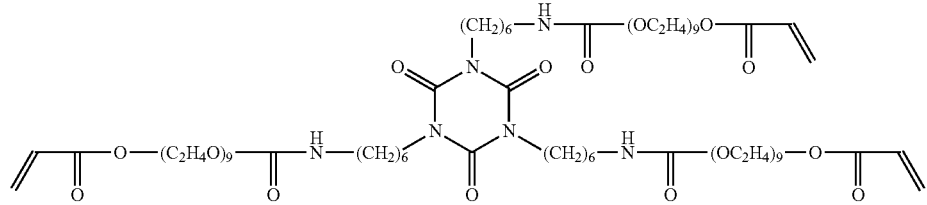

[Chemical Formula 2]

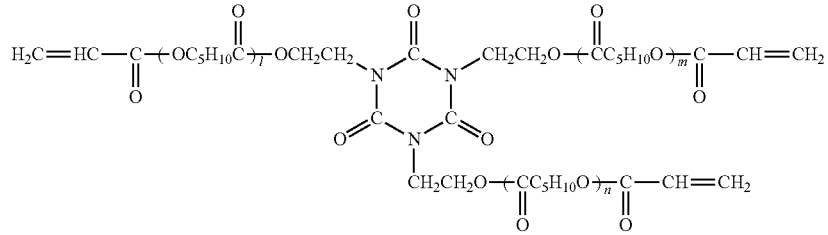

$l + m + n \approx 1$

[Chemical Formula 3]

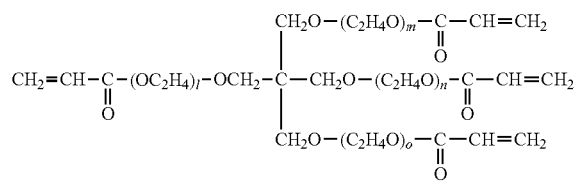

$l + m + n + o = 35$

[Chemical Formula 4]

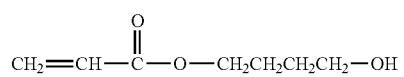

[Chemical Formula 5]

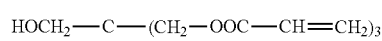

Acrylic resin I is urethane acrylate (manufactured by Shin Nakamura Chemical Co., Ltd., product name: UA-7100) and includes nitrogen elements. The chemical formula shown in [Chemical Formula 1] is based on estimation. Acrylic resin I includes a repeating structure of EO units (the repeating number is 9). Acrylic resin I is trifunctional urethane acrylate. Acrylic resin I includes a cyanuric ring, which is a heterocycle including nitrogen element.

Acrylic resin II is ε-caprolactone ethoxylated isocyanuric acid triacrylate and ethoxylated isocyanuric acid triacrylate (manufactured by Shin Nakamura Chemical Co., Ltd., product name: A93001CL) and includes nitrogen elements. Acrylic resin II includes EO units but does not include a repeating structure of EO units. Acrylic resin II is a trifunctional acrylate. Acrylic resin II includes a cyanuric ring, which is a heterocycle including nitrogen element.

Acrylic resins III to V do not include a nitrogen element. Acrylic resin III is ethoxylated pentaerythritol tetraacrylate (manufactured by Shin Nakamura Chemical Co., Ltd., product name: ATM-35E). Acrylic resin IV is 4-hydroxybutyl acrylate (manufactured by Shin Nakamura Chemical Co., Ltd., abbreviated name: 4-HBA). Acrylic resin V is pentaerythritol triacrylate (triester about: 57%) (manufactured by Shin Nakamura Chemical Co., Ltd.: A-TMM-3LM-N).

Acrylic resin III includes a repeating structure of EO units (the repeating number is not more than 35). Acrylic resin III is a tetrafunctional acrylate. Acrylic resins IV and V do not include an EO unit. Acrylic resin IV is a monofunctional acrylate. Acrylic resin IV is a monofunctional acrylate. Acrylic resin V is a trifunctional acrylate. Acrylic resins III to V do not include a ring structure.

In producing the synthetic polymer film 34A with the use of each of acrylic resins I to V, the polymerization initiator used was IRGACURE819 (bis(2,4,6-trimethylbenzoyl)-phenylphosphone oxide; molecular weight: 418.5) manufactured by BASF.

Sample films A to E were evaluated as described in the following section.

[Evaluation of Microbicidal Ability]

The microbicidal ability of the sample films was evaluated as follows:

1. Beads with frozen *P. aeruginosa* bacteria (purchased from National Institute of Technology and Evaluation) were immersed in a broth at 37° C. for 24 hours, whereby the *P. aeruginosa* bacteria were thawed;

2. Centrifugation (3000 rpm, 10 minutes);

3. The supernatant of the broth was removed;

4. Sterilized water was added, and the resultant solution was stirred and thereafter subjected to centrifugation again;

5. Steps 2 to 4 were repeated three times to obtain an undiluted bacterial solution (the bacteria count was of the order of 1E+08 CFU/mL);

6. Bacterial dilution A (the bacteria count was of the order of 1E+06 CFU/mL) was prepared.

Bacterial Dilution A: Undiluted Bacterial Solution 100 μL+Sterilized Water 9.9 mL;

7. Bacterial dilution B (the bacteria count was of the order of 1E+05 CFU/mL) was prepared by adding, to bacterial dilution A, an NB culture medium (nutrient broth medium E-MC35 manufactured by Eiken Chemical Co., Ltd.) as a nutrient source at the concentration of 1/500 and diluting the resultant mixture 10-fold (in accordance with JIS Z2801 5.4a)).

Bacterial Dilution B: Bacterial Dilution A 1 mL+Sterilized Water 8.98 mL+NB Culture Medium 20 μL;

8. A 400 μL drop of bacterial dilution B (the bacteria count in the bacterial dilution B at this point in time is also referred to as "initial bacteria count") was placed on each of the sample films. A cover (e.g., cover glass) was placed over the bacterial dilution B to adjust the amount of the bacterial dilution B per unit area.

Here, the initial bacteria count was 3.5E+05 CFU/mL;

9. The samples were left in an environment where the temperature was 37° C. and the relative humidity was 100% for a predetermined time period (time period: 4 hours or 24 hours);

10. The entire sample film with the bacterial dilution B and 9.6 mL sterilized water were put into a filter bag. The sample film was rubbed with hands over the filter bag to sufficiently wash away the bacteria from the sample film. The post-wash solution in the filter bag was a 25-fold dilution of the bacterial dilution B. This post-wash solution is also referred to as "bacterial dilution B2". The bacteria count of the bacterial dilution B2 is to be of the order of 1E+04 CFU/mL if the bacteria count in the bacterial dilution B does not increase or decrease;

11. The bacterial dilution B2 was diluted 10-fold, whereby bacterial dilution C was prepared. Specifically, the bacterial dilution C was prepared by putting 120 μL of the post-wash solution (bacterial dilution B2) into 1.08 mL sterilized water. The bacteria count of the bacterial dilution C is to be of the order of 1E+03 CFU/mL if the bacteria count in the bacterial dilution B does not increase or decrease;

12. The bacterial dilution C was diluted 10-fold in the same way as that for preparation of the bacterial dilution C, whereby bacterial dilution D was prepared. The bacteria count of the bacterial dilution D is to be of the order of 1E+02 CFU/mL if the bacteria count in the bacterial dilution B does not increase or decrease. Further the bacterial dilution D was diluted 10-fold, whereby bacterial dilution E was prepared. The bacteria count of the bacterial dilution E is to be of the order of 1E+01 CFU/mL if the bacteria count in the bacterial dilution B does not increase or decrease;

13. 1 mL drops of the bacterial dilution B2 and the bacterial dilutions C to E were placed on Petrifilm™ media (product name: Aerobic Count Plate (AC), manufactured by 3M). The bacteria were cultured at 37° C. with the relative humidity of 100%. After 48 hours, the number of bacteria in the bacterial dilution B2 was counted.

Note that, although in JIS Z2801 5.6h) a phosphate-buffered saline is used in preparation of a diluted solution, sterilized water was used herein. It was verified that the microbicidal effect which is attributed to the physical structure and chemical properties of the surface of the sample films can be examined even when sterilized water is used.

[Evaluation of Antimicrobial Ability]

When the antibacterial activity value determined from the bacteria count on a sample film after the culture of 24 hours in accordance with JIS Z 2801 was not less than 2.0 (the death rate was not less than 99%), the sample film was judged to have an antimicrobial effect. The reference film used was a base film (PET film). The antibacterial activity value is the logarithmic value of the value obtained by dividing the bacteria count after the culture of 24 hours on the PET film by the bacteria count after the culture of 24 hours on each sample film.

FIG. 8 is a graph showing the evaluation results as to the microbicidal ability. In FIG. 8, the horizontal axis represents the time period for which the sample film was left (hour), and the vertical axis represents the bacteria count in bacterial dilution B2 (CFU/mL). Note that, in FIG. 8, when the bacteria count is 0 (N.D.), it is plotted as 0.1 for the sake of visibility. Table 2 presented below shows the bacteria count after the culture and the antibacterial activity value. Note that, in calculation of the antibacterial activity value of sample film C1, the data of PET2 were used, while the data of PET1 were used for the other sample films.

As seen from FIG. 8 and Table 2, the sample films, except for sample film C1, have an antibacterial activity value of not less than 2.0 and hence have antimicrobial ability. The antibacterial activity values of sample films C2 and B are 2.6 and 3.2, respectively. The antibacterial activity values of sample films A1, A2 and A3 are 6.2, and therefore, it can be said that sample films A1, A2 and A3 have microbicidal ability. Here, when the antibacterial activity value is not less than 6.0, the sample film was judged to have a microbicidal ability. The thus-obtained evaluation results are as to the antimicrobial ability and the microbicidal ability are shown by ○/x in Table 1. ○ means that the sample film has antimicrobial ability or microbicidal ability. x means that the sample film does not have antimicrobial ability or microbicidal ability.

TABLE 2

| Sample Film | Bacteria Count (4 hours) | Bacteria Count (24 hours) | Antibacterial Activity Value |
|---|---|---|---|
| A1 | 3.3E+03 | N.D. | 6.2 |
| C2 | 8.2E+03 | 4.0E+03 | 2.6 |
| A2 | 3.4E+03 | N.D. | 6.2 |
| B | 5.1E+03 | 1.0E+03 | 3.2 |
| A3 | 3.6E+03 | N.D. | 6.2 |
| C1* | 1.2E+04 | 1.0E+05 | 1.2 |
| PET1/PET2* | 2.0E+04/1.9E+04* | 1.9E+06/1.6E+06* | — |

*Data of PET2 were used in calculation of antibacterial activity value of sample film C1.

[Evaluation of Curl and Film Separation]

A sample film was placed on a black acrylic plate, and a 400 μL drop of pure water was placed on the sample film. The resultant sample was covered with a spreader (a lid for Petrifilm manufactured by 3M). The resultant piece was placed in a case together with absorbent cotton wetted with pure water, and the case was tightly closed by a tape. This is for the purpose of keeping the inside environment of the case at the humidity of about 100%.

An incubator (IQ820 manufactured by Yamato Scientific Co., Ltd.) was set to 37° C., and a beaker containing 200 mL pure water was set in the incubator. As a result, the relative humidity inside the incubator was about 100%. In this incubator, the previously-prepared case was left for 4 hours. Thereafter, the incubator was powered off, and the case was still left there for another 15 hours. After the passage of 15 hours, the temperature of the case was checked, and it was found that the temperature of the case decreased to the room temperature (about 20° C.).

The appearance of the film inside the case returned to the room temperature was checked with eyes.

Whether or not the film inside the case curled and the degree of the curl were observed. The evaluation results are shown in Table 1 as follows: "○" means that no curl was found; "Δ" means that curl was found only at edges; and "x" means that the film curled to such an extent that the film lifted up the lid.

Also, whether or not the film inside the case had a film separation and the degree of the film separation were observed. The evaluation results are shown in Table 1 as follows: "○" means that no film separation was found; "Δ" means that partial film separation was found; and "x" means that entire film separation was found.

Now, compare the results as to curl/film separation shown in Table 1 with the results as to the number of moles of EO unit. When the number of moles of EO unit was not less than 0.0100, film separation occurred at least partially, and curl was found at edges except for the film in which resin E was used. On the contrary, when the number of moles of EO unit was not more than 0.0080, no film separation occurred. Curl was found at edges only in the film in which resin A1 was used. From these results, it can be said that, when the number of moles of EO unit is not more than 0.0080, occurrence of curl and/or film separation can be prevented.

As for the antimicrobial ability and the microbicidal ability, the sample films have at least antimicrobial ability except for the film in which resin C1 was used. From the viewpoint of antimicrobial ability, it is estimated that the number of moles of EO unit preferably exceeds 0.0020.

Note that, although resins A4, A5, D and E were not evaluated at this time, it is deduced from the evaluation results of resins which have like or similar compositions that each of these resins has antimicrobial ability and microbicidal ability.

In Table 1, the nitrogen element concentration of the total of nitrogen elements which are constituents of the primary amines and nitrogen elements which are constituents of the secondary amines and the nitrogen element concentration calculated with all nitrogen elements (i.e., including nitrogen elements which are constituents of the tertiary amines) are shown together. The evaluation results as to the antimicrobial ability and the microbicidal ability seem to have a correlation with the nitrogen element concentration of nitrogen elements which are constituents of the primary or secondary amines as compared with the nitrogen element concentration calculated with all nitrogen elements including nitrogen elements which are constituents of the tertiary amines. The reason for this is as follows. The nitrogen elements which are constituents of the tertiary amines are less basic, and therefore, it is estimated that these nitrogen elements are unlikely to contribute to the microbicidal ability of the synthetic polymer film. In addition, in acrylic resins I and II that includes nitrogen elements, nitrogen element which are constituents of the tertiary amines form a ring. The nitrogen elements that form a ring are present at a position relatively distant from the surface of the synthetic polymer film and are widely distant from a microorganism. Therefore, it is estimated that these nitrogen elements scarcely contribute to the microbicidal ability of the synthetic polymer film.

Although International Publication 2 mentioned above discloses that the concentration of the nitrogen element at the surface is preferably not less than 0.7 at % from the viewpoint of microbicidal ability, we found that the microbicidal ability can be achieved even when the nitrogen element concentration is less than 0.7 at % in the used resin. It can be said that the antimicrobial ability can be achieved so long as the nitrogen element concentration of the total of nitrogen elements which are constituents of the primary amines and nitrogen elements which are constituents of the secondary amines is at least not less than 0.293 at % (resin C2). It can be said that the antimicrobial ability can be achieved so long as the nitrogen element concentration of the total of nitrogen elements which are constituents of the primary amines and nitrogen elements which are constituents of the secondary amines is not less than 0.29 at % when rounded off to two decimal places. In order that the synthetic polymer film has microbicidal ability, the nitrogen element concentration of the total of nitrogen elements which are constituents of the primary amines and nitrogen elements which are constituents of the secondary amines is preferably not less than 0.327 at % (resin A1). In order that the synthetic polymer film has microbicidal ability, the nitrogen element concentration of the total of nitrogen elements which are constituents of the primary amines and nitrogen elements which are constituents of the secondary amines is preferably not less than 0.33 at % when rounded off to two decimal places. In this case, it is estimated that the number of moles of EO unit included in one gram of the resin is preferably not less than 0.0040.

Resins A1, C2, A2, B and A3 in Table 1 have at least antimicrobial ability, and occurrence of curl and film separation is prevented. Particularly, resins A1, A2 and A3, in which acrylic resin I (urethane acrylate) and acrylic resin V (trifunctional acrylate, not including EO units) are mixed together, have microbicidal ability. Of these resins, resins A2 and A3 cause no curl in the water resistance test and are the best-balanced resins.

Since resins A1, C2, A2, B and A3 include EO units in an appropriate proportion and are hydrophilic, the films can be cleaned with wetted cloth. Also, resins A1, C2, A2, B and A3 have flexibility and therefore have excellent abrasion resistance.

As seen from the SEM images of FIG. 7, raised portions with no *P. aeruginosa* bacterium adhering thereto extend generally parallel to a normal direction of the synthetic polymer film, while some of raised portions with a *P. aeruginosa* bacterium adhering thereto tilt (warp) toward the The chemical structure formula of acrylic resin I' will be shown in [Chemical Formula 6]. The chemical formula shown in [Chemical Formula 6] is based on estimation. Acrylic resin I' includes a repeating structure of EO units (the repeating number is 4 or 5). Acrylic resin I' is different from acrylic resin I in that the number of EO units of acrylic resin I' is about half of that of acrylic resin I. Acrylic resin I' is urethane acrylate (manufactured by Shin Nakamura Chemical Co., Ltd.) and includes nitrogen elements. Acrylic resin I' is trifunctional urethane acrylate. Acrylic resin I' includes a cyanuric ring, which is a heterocycle including nitrogen element.

TABLE 3

|  | Acrylic Resin I UA-7100 | Acrylic Resin I' UA-7100LM | Acrylic Resin V A-TMM-3LM-N | Photoinitiator IRGACURE OXE 01 | Number of Moles of EO Unit | Nitrogen at % (Primary and Secondary Amines) | Nitrogen at % (All Nitrogen Elements) |
|---|---|---|---|---|---|---|---|
| Number of EO Units/ MW | 27/1908 | 12/1248 15/1380 | 0/298 |  |  |  |  |
| Resin F | 99.29% | — | — | 0.71% | 0.0141 | 1.035 | 2.081 |
| Resin G | — | 99.29% | — | 0.71% | 0.0095 | 1.629 | 3.269 |
|  |  |  |  |  | 0.0108 | 1.461 | 2.933 |
| Resin H | 56.74% | — | 42.55% | 0.71% | 0.0080 | 0.627 | 1.265 |

[Chemical Formula 6]

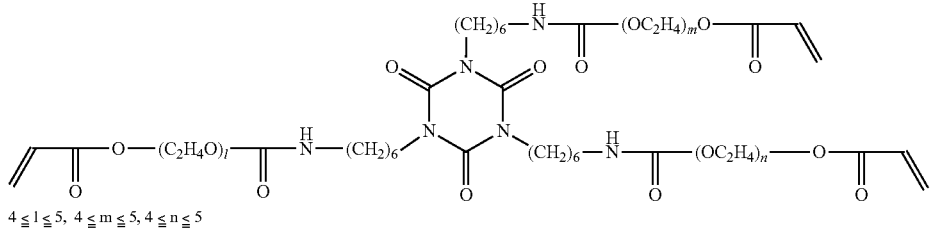

$4 \leq l \leq 5, 4 \leq m \leq 5, 4 \leq n \leq 5$

*P. aeruginosa* bacterium. Tilting (warping) of raised portions enable more raised portions to come in contact with microorganisms. It is estimated that a synthetic polymer film which has over its surface raised portions which are capable of tilting (warping) toward microorganisms has a more excellent microbicidal effect. There is a probability that a resin which includes EO units to an appropriate extent exhibits a microbicidal effect due to this warpage.

[2] Suppression of Decrease of Microbicidal Effect of Synthetic Polymer Film

Next, we researched how to suppress decrease of the microbicidal effect (including microbicidal ability and antimicrobial ability) of the synthetic polymer film 34A when the synthetic polymer film 34A was kept in contact with water for a certain period of time (e.g., a few or more hours).

Sample films F, G and H were prepared which had the same configuration as that of the film 50A shown in FIG. 1(a). As the acrylic resin (acrylate monomer or acrylate oligomer) for production of the synthetic polymer film 34A that has the moth-eye structure over the surface, 3 types of resins shown in Table 3 below, resins F, G and G, were used. Hereinafter, the sample films are also identified by F, G and H affixed to their names as the resins are. Table 3 shows the composition of the respective resins (in Table 3, % means mass %).

Table 3 shows the molecular weight (MW) and the number of EO units included in one molecule of the respective acrylic resin as Table 1 does. As for the molecular weight (MW) and the number of EO units included in one molecule of acrylic resin I', values obtained in a case where all the repeating numbers of the repeating structures of EO units are (in the chemical structure formula, l=m=n=4), in the upper part, and values obtained in a case where all the repeating numbers of the repeating structures of EO units are 5 (in the chemical structure formula, l=m=n=5), in the lower part, are shown together. Table 3 also shows the number of moles of EO unit included in one gram of each of resins F, G and H, which was calculated based on the composition and the chemical formulae. The number of moles of EO unit included in one gram of resin G that includes acrylic resin I' is shown for both the case of l=m=n=4 (upper part) and the case of l=m=n=5 (lower part). As shown in Table 3, it is estimated that the number of moles of EO unit included in one gram of resin G that includes acrylic resin I' is not less than 0.0095 and not more than 0.0108.

Table 3 shows, for each of resins F, G and H, the amount of nitrogen elements in at % which was calculated based on the composition and the chemical formulae. In Table 3, the nitrogen element concentration of the total of nitrogen elements which are constituents of the primary amines and nitrogen elements which are constituents of the secondary amines and the nitrogen element concentration calculated with all nitrogen elements (i.e., including nitrogen elements which are constituents of the tertiary amines and nitrogen elements which are not constituents of amines) are shown together. As shown in Table 3, it is estimated that the concentration of nitrogen elements which are constituents of the primary amines or the secondary amines (i.e., the nitrogen element concentration of the total of nitrogen elements which are constituents of the primary amines and nitrogen elements which are constituents of the secondary amines) of resin G that includes acrylic resin I' is not less than 1.461 at % and not more than 1.629 at %. It is estimated that the concentration of nitrogen elements which are constituents of the primary amines or the secondary amines of resin G that includes acrylic resin I' is not less than 1.46 at % and not more than 1.63 at % when rounded off to two decimal places.

Resins F, G and H were each dissolved into MEK (manufactured by Maruzen Petrochemical Co., Ltd.), resulting in a solution, 70 mass % of which was solid. The resultant solution was applied onto the base film 42A, and MEK was removed by heating, whereby a film having a thickness of about 25 μm to 50 μm was obtained. Note that the base film 42A used was a 50 μm thick PET film (A4300 manufactured by TOYOBO CO., LTD.). Thereafter, a synthetic polymer film 34A which had the moth-eye structure over the surface was produced using the moth-eye mold 100A through the same process as that described with reference to FIG. 6. The exposure amount was about 1500 mJ/cm$^2$. UV irradiation was carried out, by using an UV lamp (Light Hammer6 J6P3 manufactured by Fusion UV Systems; maximum power: 200 W/cm), for 30 seconds at the power level of 45% (50 mW/cm$^2$). The polymerization initiator used was IRGACURE OXE 01 (1,2-Octanedione, 1-[4-(phenylthio)phenyl]-, 2-(o-benzoyloxime); molecular weight: 445.6) manufactured by BASF. In each sample film, $D_p$ was about 200 nm, $D_{int}$ was about 200 nm, and $D_h$ was about 150 nm. The size of each sample film was a square of 5.1 cm on each side (5.1 cm square).

For each of sample films F, G and H, three types of samples were prepared: a sample not immersed in pure water, a sample immersed in pure water for 6 hours, and a sample immersed in pure water for 24 hours. In immersing the sample films into pure water, the sample films were fixed with clothespins and entirely immersed into pure water (1.5 L, temperature: 37° C.) contained in a tank. The tank was placed in an incubator (IQ820 manufactured by Yamato Scientific Co., Ltd.) which was set to 37° C.

The thus-obtained sample films F, G and H were evaluated as to the microbicidal ability and the antimicrobial ability according to the same method as that employed for the evaluation of sample films A to E. The evaluation method for the microbicidal ability of sample films F, G and H was different from the evaluation method for the microbicidal ability of sample films A to E in the following points.

In the evaluation method for the microbicidal ability of sample films F, G and H, a square PET film of 4 cm on each side was used as the cover placed over bacterial dilution B. Bacteria on sample films F, G and H were washed out using 10 mL SCDLP culture medium. Therefore, the post-wash solution in the filter bag was a 26-fold dilution of the bacterial dilution B. This post-wash solution is also referred to as "bacterial dilution B3". The SCDLP culture medium was prepared as follows:

38 g SCDLP agar culture medium "DAIGO" (manufactured by Nihon Pharmaceutical Co., Ltd.) was put into 1 L purified water. The resultant solution was shaken and then heated to 90° C. or higher such that the culture medium was dissolved;

The resultant solution was poured into containers and sterilized in an autoclave at 121° C. for 15 minutes; and Immediately after the sterilization, the solution was shaken sufficiently such that the polysorbate layer was homogenized.

In the step of diluting the post-wash solution (bacterial dilution B3), phosphate buffer saline (PBS) was used. For example, 1 mL of the post-wash solution (bacterial dilution B3) was put into 9 mL of the phosphate buffer saline (PBS), whereby the post-wash solution (bacterial dilution B3) was diluted 10-fold.

For the sake of evaluation of sample films F, G and H as to the antimicrobial ability, the "quasi antibacterial activity value (6h)" is herein defined in the same way as the antibacterial activity value. As previously described, the antibacterial activity value is the logarithmic value of the value obtained by dividing the bacteria count after the culture of 24 hours on the PET film by the bacteria count after the culture of 24 hours on each sample film. According to this rule, the logarithmic value of the value obtained by dividing the bacteria count after the culture of 6 hours on the PET film by the bacteria count after the culture of 6 hours on each sample film is defined as "quasi antibacterial activity value (6h)".

Figure 9:
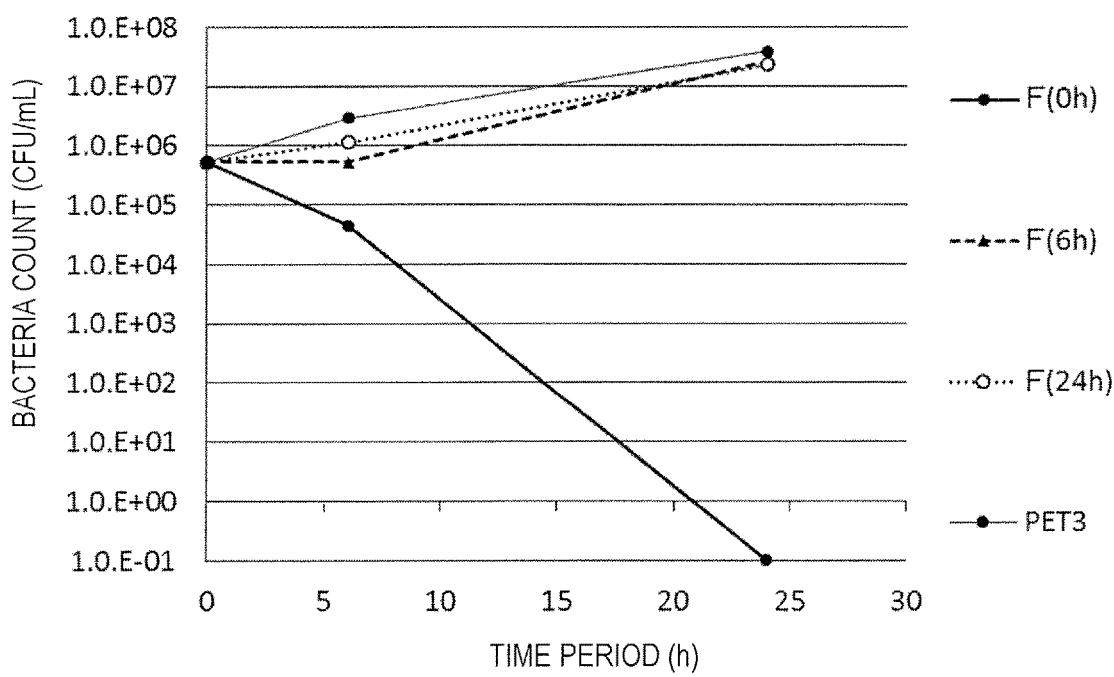
FIG. 9 A graph showing the evaluation results as to the microbicidal ability.
Figure 10:
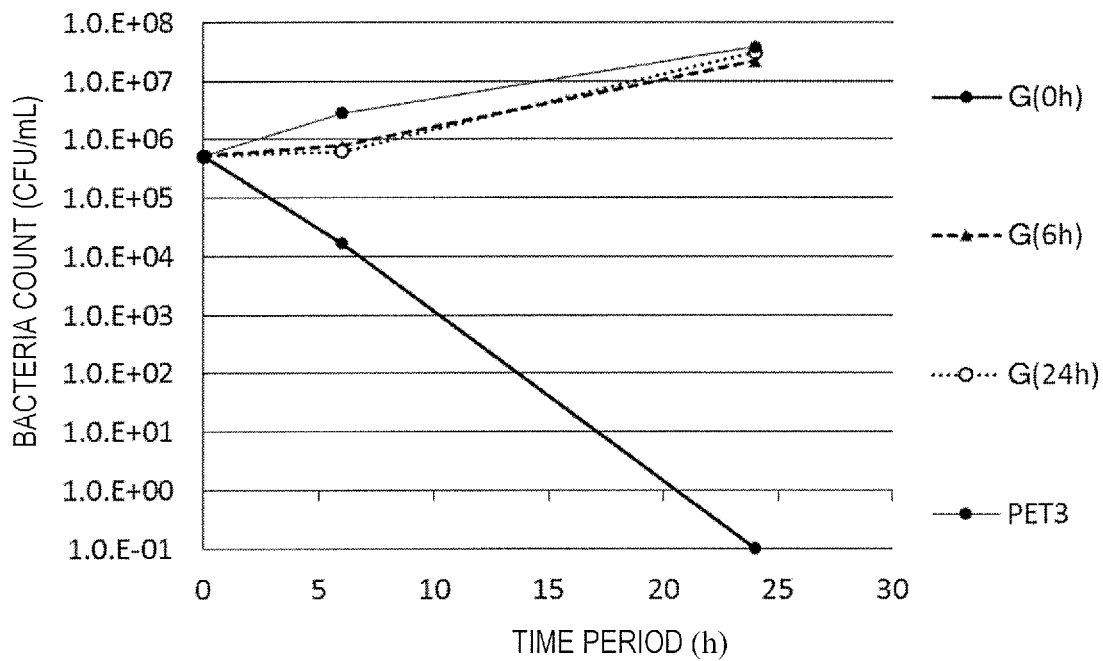
FIG. 10 A graph showing the evaluation results as to the microbicidal ability.
Figure 11:
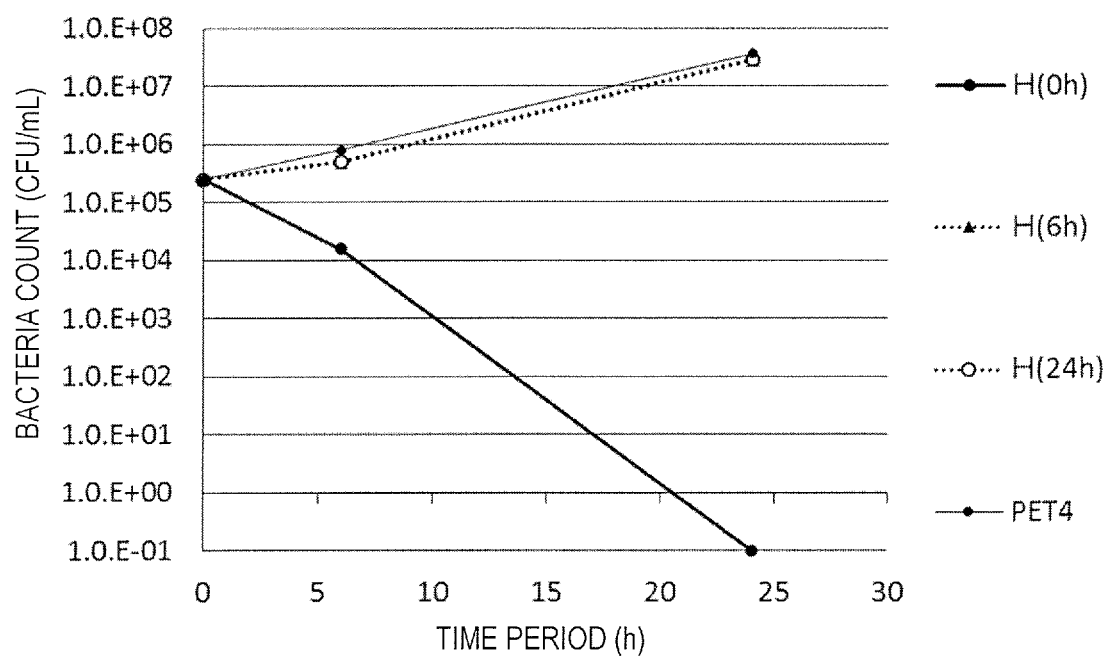
FIG. 11 A graph showing the evaluation results as to the microbicidal ability.

FIG. 9 to FIG. 11 are graphs showing the evaluation results as to the microbicidal ability. In FIG. 9 to FIG. 11, the horizontal axis represents the time period for which the sample film was left (hour), and the vertical axis represents the bacteria count in bacterial dilution B3 (CFU/mL). Note that, in FIG. 9 to FIG. 11, when the bacteria count is 0 (N.D.), it is plotted as 0.1 for the sake of visibility. Table 4 presented below shows the bacteria count after the culture, the antibacterial activity value, and the quasi antibacterial activity value (6h). Note that, in calculation of the antibacterial activity value and the quasi antibacterial activity value (6h) of sample films F and G, the data of PET3 were used. In calculation of the antibacterial activity value and the quasi antibacterial activity value (6h) of sample film H, the data of PET4 were used.

TABLE 4

| Sample Film (Immersion Time) | Bacteria Count (CFU/mL) | | | Quasi Anti-bacterial Activity Value (6 hours) | Anti-bacterial Activity Value (24 hours) |
| --- | --- | --- | --- | --- | --- |
| | 0 hours | 6 hours | 24 hours | | |
| F (0 hours) | 5.3E+05 | 4.6E+04 | N.D. | 1.8 | 7.6 |
| F (6 hours) | 5.3E+05 | 5.3E+05 | 2.6E+07 | 0.7 | 0.2 |
| F (24 hours) | 5.3E+05 | 1.1E+06 | 2.3E+07 | 0.4 | 0.2 |
| G (0 hours) | 5.3E+05 | 1.7E+04 | N.D. | 2.2 | 7.6 |
| G (6 hours) | 5.3E+05 | 7.9E+05 | 2.2E+07 | 0.6 | 0.2 |
| G (24 hours) | 5.3E+05 | 6.2E+05 | 3.1E+07 | 0.7 | 0.1 |
| PET3 | 5.3E+05 | 2.9E+06 | 3.8E+07 | — | — |
| H (0 hours) | 2.5E+05 | 1.6E+04 | N.D. | 1.7 | 7.6 |
| H (6 hours) | 2.5E+05 | 4.8E+05 | 2.7E+07 | 0.2 | 0.1 |
| H (24 hours) | 2.5E+05 | 5.0E+05 | 2.9E+07 | 0.2 | 0.1 |
| PET4 | 2.5E+05 | 7.8E+05 | 3.6E+07 | — | — |

Sample films F, G and H which were not immersed in water had microbicidal ability. In each sample film, the antibacterial activity value was 7.6. It can therefore be said that sample films F, G and H had excellent microbicidal ability of substantially equal degrees. On the other hand, when immersed in water for 6 hours, none of sample films F, G and H had microbicidal ability or antimicrobial ability.

Sample films F, G and H were examined as to decrease of the microbicidal effect of the synthetic polymer film 34 which occurred when the film was entirely immersed into pure water in a tank (1.5 L; temperature: 37° C.) so as to be in contact with water for a certain period of time. This can be equivalent to an accelerated aging test in the case where the film is used for sterilization of kitchen or bathroom facilities. That is, it is estimated that the decrease of the microbicidal effect of the synthetic polymer film 34 which occurs when the synthetic polymer film 34 is in contact with water for a certain period of time depends on the temperature of water, the area of contact with water, the humidity, etc.

From the viewpoint of suppress decrease of the microbicidal ability and the antimicrobial ability when the film is immersed in water, sample film G is better than sample films F and H as will be described in the following paragraphs. Here, the quasi antibacterial activity value (6h) is used in the following description because the antibacterial activity values of sample films immersed in water for not less than 6 hours have small differences.

As for the quasi antibacterial activity value (6h) of the sample films immersed in water for 24 hours, the value of sample film H was 0.2, while the value of sample film F was 0.4, and the value of sample film G was 0.7. Considering that the sample films which were not immersed in water had microbicidal ability of substantially equal degrees, the decrease of the microbicidal ability and the antimicrobial ability was most suppressed in sample film G, and was second and third most suppressed in sample film F and sample film H, respectively.

The same conclusion can also be derived by comparison of the quasi antibacterial activity values (6h) of the sample films immersed in water for 6 hours with the quasi antibacterial activity values (6h) of the sample films immersed in water for 24 hours. Sample film H had a low quasi antibacterial activity value (6h), 0.2, when immersed in water for 6 hours and when immersed in water for 24 hours. Sample film F immersed in water for 6 hours had the quasi antibacterial activity value (6h) of 0.7, which was higher than that of sample film H. However, when immersed in water for 24 hours, the quasi antibacterial activity value (6h) of sample film F decreased to 0.4. On the other hand, sample film G immersed in water for 6 hours had the quasi antibacterial activity value (6h) of 0.6, which was higher than that of sample film H. Further, even when the film was immersed in water for 24 hours, the quasi antibacterial activity value (6h) scarcely varied (0.7). Thus, it is seen that sample film G is better than sample films F and H from the viewpoint of suppressing decrease of the microbicidal ability and the antimicrobial ability when the film is immersed in water.

As previously described, if the proportion of EO units included in the entire acrylic resin that forms the synthetic polymer film 34A is excessively large, the synthetic polymer film 34A is excessively hydrophilic. Sample films G and H have smaller number of moles of EO unit than that of sample film F. Sample film G includes, instead of acrylic resin I that forms sample film F, acrylic resin I' in which the number of EO units is about a half of that of acrylic resin I and therefore has a smaller number of moles of EO unit than sample film F. Sample film G includes, instead of part of acrylic resin I, acrylic resin V that does not include EO units and therefore has a smaller number of moles of EO unit than sample film F. Although sample films G and H each have a smaller number of moles of EO unit than sample film F, sample film G was more excellent as previously described from the viewpoint of suppressing decrease of the microbicidal ability and the antimicrobial ability when the film is immersed in water.

From the viewpoint of suppressing decrease of the microbicidal ability and the antimicrobial ability when the film is immersed in water, it is preferred that the synthetic polymer film 34A includes a urethane acrylate structure, and the urethane acrylate structure includes a repeating structure of EO units but does not include a repeating structure whose repeating number is not less than 9. It is estimated that, more preferably, the urethane acrylate structure does not include a repeating structure whose repeating number is not less than 6.

Sample films F and G immersed in water for 24 hours were observed with eyes as to the degree of the curl. Curl was found in both sample films F and G. The degree of the curl of sample film G was suppressed as compared with the degree of the curl of sample film F.

A synthetic polymer film according to an embodiment of the present invention is suitably applicable to uses of suppressing generation of slime on a surface which is in contact with water, for example. For example, the synthetic polymer film is attached onto the inner walls of a water container for a humidifier or ice machine, whereby generation of slime on the inner walls of the container can be suppressed. The slime is attributed to a biofilm which is formed of extracellular polysaccharide (EPS) secreted from bacteria adhering to the inner walls and the like. Therefore, killing the bacteria adhering to the inner walls and the like enables suppression of generation of the slime.

As described above, bringing a liquid into contact with the surface of a synthetic polymer film according to an embodiment of the present invention enables sterilization of the liquid. Likewise, bringing a gas into contact with the surface of a synthetic polymer film according to an embodiment of the present invention enables sterilization of the gas. In general, microorganisms have such a surface structure that they can easy adhere to the surface of an object in order to increase the probability of contact with organic substances which will be their nutrients. Therefore, when a liquid or gas which contains microorganisms is brought into contact with a microbicidal surface of a synthetic polymer film according to an embodiment of the present invention, the microorganisms are likely to adhere to the surface of the synthetic polymer film, and therefore, on that occasion, the liquid or gas is subjected to the microbicidal activity.

Although the microbicidal activity of a synthetic polymer film according to an embodiment of the present invention against *P. aeruginosa* that is a Gram-negative bacteria has been described in this section, the synthetic polymer film has a microbicidal activity not only on Gram-negative bacteria but also on Gram-positive bacteria and other microorganisms. One of the characteristics of the Gram-negative bacteria resides in that they have a cell wall including an exine. The Gram-positive bacteria and other microorganisms (including ones that do not have a cell wall) have a cell membrane. The cell membrane is formed by a lipid bilayer as is the exine of the Gram-negative bacteria. Therefore, it is estimated that the interaction between the raised portions of the surface of the synthetic polymer film according to an embodiment of the present invention and the cell membrane is basically the same as the interaction between the raised portions and the exine.

INDUSTRIAL APPLICABILITY

A synthetic polymer film which has a microbicidal surface according to an embodiment of the present invention is applicable to various uses including, for example, uses for sterilization of surfaces of kitchen and bathroom facilities. The synthetic polymer film which has a microbicidal surface according to an embodiment of the present invention can be produced at low cost.

REFERENCE SIGNS LIST 34A, 34B synthetic polymer film
34Ap, 34Bp raised portion
42A, 42B base film
50A, 50B film
100, 100A, 100B moth-eye mold

The invention claimed is:

1. A synthetic polymer film having a surface which has a plurality of raised portions, wherein
a two-dimensional size of the plurality of raised portions is in a range of more than 20 nm and less than 500 nm when viewed in a normal direction of the synthetic polymer film, the surface having a microbicidal effect,
the synthetic polymer film includes a urethane acrylate structure,
the urethane acrylate structure includes a repeating structure of an ethylene oxide unit of which n is equal to or less than 5 where n is a repeating number of the repeating structure (n is an integer equal to or more than 2),
the urethane acrylate structure does not include a repeating structure of the ethylene oxide unit of which n is equal to or more than 6,
a number of moles of an ethylene oxide unit included in one gram is equal to or more than 0.0095 and equal to or less than 0.0108, and
when the synthetic polymer film is brought into contact with water for a predetermined duration, decrease of the microbicidal effect is suppressed.

2. The synthetic polymer film of claim 1, wherein the urethane acrylate structure includes a polymer of a urethane acrylate monomer which has three or more functional groups.

3. The synthetic polymer film of claim 2, wherein the urethane acrylate monomer includes a heterocycle which includes a nitrogen element.

4. The synthetic polymer film of claim 3, wherein the heterocycle is a cyanuric ring.

5. The synthetic polymer film of claim 1, wherein a concentration of a total of a nitrogen element which is a constituent of a primary amine and a nitrogen element which is a constituent of a secondary amine is equal to or more than 1.46 at % and equal to or less than 1.63 at %.

6. The synthetic polymer film of claim 1, wherein the synthetic polymer film is made of a photocurable resin which contains a photopolymerization initiator, and the photopolymerization initiator contains 1,2-Octanedione, 1-[4-(phenylthio)phenyl]-,2-(o-benzoyloxime).

* * * * *